(12) United States Patent
Gupta et al.

(10) Patent No.: US 9,650,558 B2
(45) Date of Patent: May 16, 2017

(54) OIL FIELD TREATMENT FLUIDS

(75) Inventors: D. V. Satyanarayana Gupta, The Woodlands, TX (US); Madhukar Chetty, Houston, TX (US); Paul Carman, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 437 days.

(21) Appl. No.: 13/019,375

(22) Filed: Feb. 2, 2011

(65) Prior Publication Data

US 2012/0196776 A1 Aug. 2, 2012

(51) Int. Cl.
*C09K 8/62* (2006.01)
*C09K 8/12* (2006.01)
*C09K 8/68* (2006.01)

(52) U.S. Cl.
CPC . *C09K 8/12* (2013.01); *C09K 8/68* (2013.01)

(58) Field of Classification Search
None
See application file for complete search history.

(56) References Cited

U.S. PATENT DOCUMENTS

| | | | | |
|---|---|---|---|---|
| 4,293,428 A | * | 10/1981 | Gale | C09K 8/584 166/270.1 |
| 4,612,991 A | * | 9/1986 | Shaw | B01F 17/005 166/270.1 |
| 5,480,863 A | | 1/1996 | Oakley et al. | |
| 7,517,836 B2 | * | 4/2009 | Chatterji et al. | 507/244 |
| 2004/0063587 A1 | * | 4/2004 | Horton et al. | 507/100 |
| 2008/0045420 A1 | * | 2/2008 | Karagianni | C08F 246/00 507/121 |
| 2010/0093874 A1 | | 4/2010 | Monin et al. | |
| 2010/0197530 A1 | | 8/2010 | Gupta et al. | |

FOREIGN PATENT DOCUMENTS

| | | |
|---|---|---|
| ES | 2 077 040 | 11/1995 |
| RU | 2377403 C2 | 12/2009 |

OTHER PUBLICATIONS

Colombian Patent and Trademark Office; Official Action issued in Colombian Patent Application No. 13-172.857; dated Dec. 7, 2015, EP equivalent in English considered.
Patent Office of the Russian Federation; Office Action issued in Russia Patent Application No. 2013140417 dated Jul. 4, 2016.

* cited by examiner

*Primary Examiner* — John J Figueroa
(74) *Attorney, Agent, or Firm* — Parsons Behle & Latimer

(57) ABSTRACT

A method of servicing a well is disclosed. The method comprises mixing ingredients to form a well servicing fluid. The ingredients comprise (i) at least one surfactant chosen from alcohol ethoxylates, $C_4$ to $C_{12}$ primary alcohols and ethoxylated propoxylated alcohols, (ii) a zwitterionic polymer prepared by inverse emulsion polymerization of at least one monomer $A_b$ comprising a betaine group and optionally one or more nonionic monomers $B_a$, and (iii) a saline based aqueous solution. The well servicing fluid is introduced into a hydrocarbon well.

28 Claims, 20 Drawing Sheets

OIL FIELD TREATMENT FLUIDS

BACKGROUND

The present disclosure relates generally to a method of servicing a well, and more particularly to the viscosification of a well servicing fluid using polymers comprising betaine units in combination with at least one surfactant.

It is well known in the art that well servicing fluids can be made by batch mixing or on-the-fly mixing processes. Batch mixing processes can be employed when longer mixing times are needed. In "on-the-fly" processes, the well servicing fluid is mixed immediately before, or simultaneously as, the fluid is pumped downhole. For on the fly processes, the mixing generally occurs for a relatively short period of time compared to batch mixing processes.

For an on-the-fly processes to be feasible, the ingredients of the well servicing fluid should be capable of mixing quickly to provide desired well servicing fluid properties. For example, in some instances it may be desirable for the well servicing fluid to reach a target viscosity before being pumped downhole.

In order to achieve desired viscosities, it is well known in the art to employ viscosifying agents. For example, the use of polymers comprising betaine units for viscosifying hydrocarbon well fluids was disclosed by D. V. Satyanarayana Gupta et al., in copending U.S. Patent Application Publication No. 2010/0197530 ("the '530 Application"), published on Aug. 5, 2010, the disclosure of which is hereby incorporated by reference in its entirety. The application discloses a servicing fluid for use in natural gas or oil field wells. The well servicing fluid includes an aqueous brine media and a zwitterionic polymer. The zwitterionic polymer is prepared by polymerization of at least one monomer, $A_b$, comprising a betaine group and optionally one or more nonionic monomers, $B_a$.

The zwitterionic polymers of the '530 Application are mixed with brines for a relatively long period of time before a desired viscosity is achieved. For example, the brines are disclosed as being mixed for about 15 minutes at a constant shear at approximately 700 RPMs with a surfactant, such as ammonium salts of polyarylphenyl ether sulfate, until a desired viscosity of the fluid is reached.

It would be desirable to reduce the time it takes to mix well servicing fluid components, such as the zwitterionic polymers of the '530 application. Faster mixing can save time and money. In some instances, it may also provide the ability to mix well servicing fluids on-the-fly. The ability to employ either batch or on-the-fly mixing processes increases process flexibility.

Accordingly, there exists a need for improved well bore-servicing fluids that address one or more of the issues discussed above.

SUMMARY

An embodiment of the present disclosure is directed to a method of servicing a well. The method comprises mixing ingredients to form a well servicing fluid. The ingredients comprise (i) at least one surfactant chosen from alcohol ethoxylates, $C_4$ to $C_{12}$ primary alcohols and ethoxylated propoxylated alcohols, (ii) a zwitterionic polymer prepared by inverse emulsion polymerization of at least one monomer $A_b$ comprising a betaine group and optionally one or more nonionic monomers $B_a$, and (iii) a saline based aqueous solution. The well servicing fluid is introduced into a hydrocarbon well.

Another embodiment of the present disclosure is directed to a surfactant preblend. The surfactant preblend comprises a first surfactant chosen from alcohol ethoxylates; a second surfactant chosen from $C_4$ to $C_{12}$ primary alcohols; and a third surfactant chosen from ethoxylated propoxylated alcohols.

The methods and compositions of the present application can provide one or more of the following advantages: reduced mixing time, the ability to allow on-the-fly mixing in high salinity water, good rheological stability at increased temperatures, improved static proppant suspension properties, good stability at a relatively high ionic strength and/or good stability in a relatively saline medium, such as a brine; good thickening power for media comprising a relatively high ionic strength, such as saline media, including highly saline media, and/or a thickening power at low contents of polymer.

Figure 1:
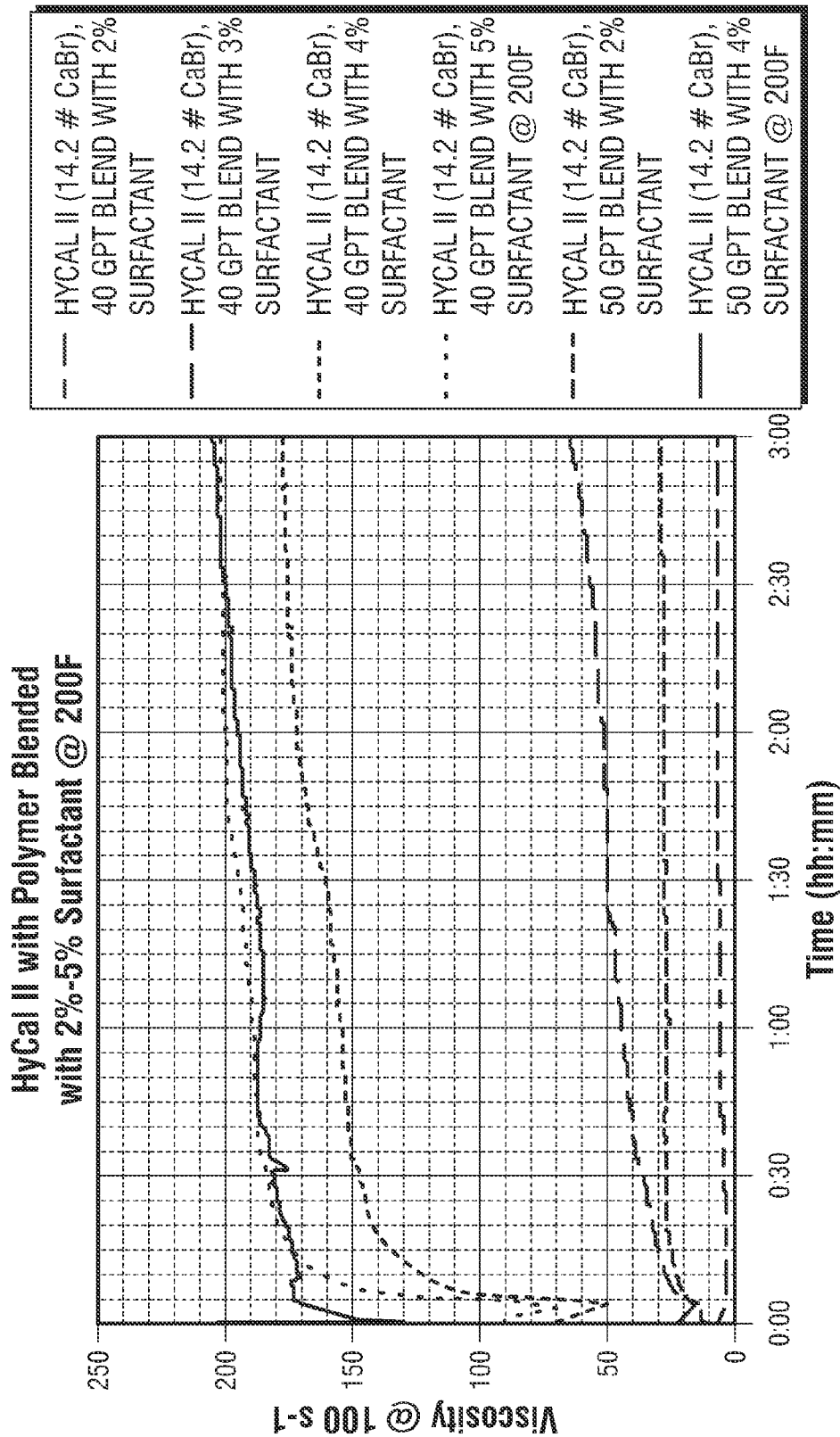
FIGS. 1 to 19 illustrate test data for various mixtures, according to embodiments of the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

An embodiment of the present disclosure is directed to a method of servicing a hydrocarbon producing well. The method comprises mixing ingredients to form a well servicing fluid prior to or simultaneously with introducing the well servicing fluid into the well. The servicing fluid includes (i) a zwitterionic polymer prepared by inverse emulsion polymerization of at least one monomer $A_b$ comprising a betaine group and optionally one or more nonionic monomers $B_a$, (ii) at least one surfactant chosen from alcohol ethoxylates, $C_4$ to $C_{12}$ primary alcohols and ethoxylated propoxylated alcohols, and (iii) a saline based aqueous solution.

According to the present disclosure, the monomer, $A_b$, can be chosen from at least one of the following monomers:

A) substituted or unsubstituted alkylsulphonates or alkylphosphonates of dialkylammonioalkyl acrylates, dialkylammonioalkyl methacrylates, dialkylammonioalkyl acrylamides, dialkylammonioalkyl methacrylamides, dialkylammonioalkoxyalkyl acrylates, dialkylammonioalkoxyalkyl methacrylates, dialkylammonioalkoxyalkyl acrylamides, and dialkylammonioalkoxyalkyl methacrylamides, such as:

1) sulphopropyldimethylammonioethyl methacrylate, sold by Raschig under the name SPE (Formula 1):

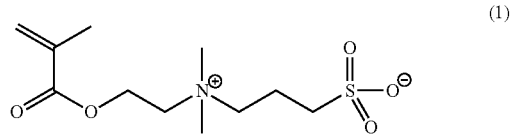 [SMILES: C=C(C)C(=O)OCC[N+](C)(C)CCCS(=O)(=O)[O-]]

(1)

2) sulphoethyldimethylammonioethyl methacrylate (Formula 2) and sulphobutyldimethylammonioethyl methacrylate (Formula 3):

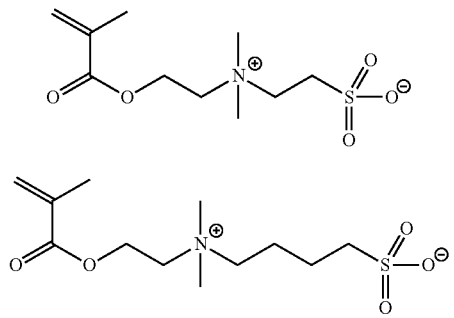

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002), the disclosure of which is incorporated herein by reference in its entirety.

3) sulphohydroxypropyldimethylammonioethyl methacrylate (SHPE) (Formula 4):

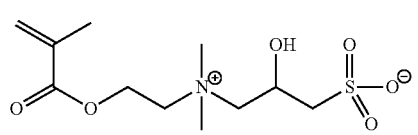

4) sulphopropyldimethylammoniopropylacrylamide (Formula 5):

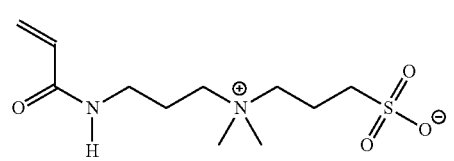

the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994), the disclosure of which is incorporated herein by reference in its entirety.

5) sulphopropyldimethylammoniopropylmethacrylamide, sold by Raschig under the name SPP (Formula 6):

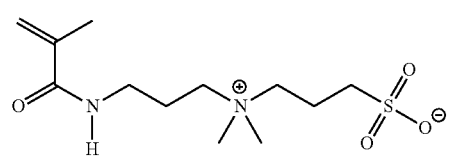

6) sulphopropyldimethylammonioethyl acrylate, sold by Raschig under the name SPDA (Formula 7):

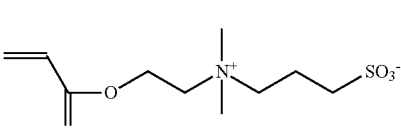

7) sulphohydroxypropyldimethylammoniopropylmethacrylamide ("SHPP") (Formula 8)

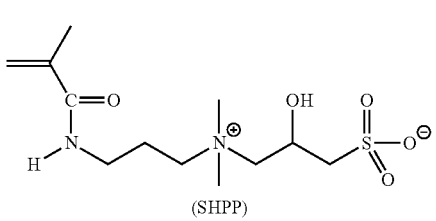

8) sulphopropyldiethylammonioethoxyethyl methacrylate (Formula 9)

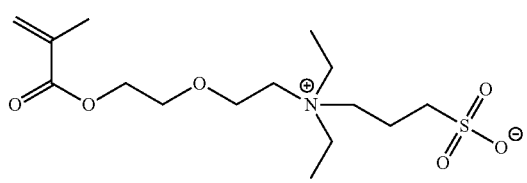

the synthesis of which is described in the paper "Poly(sulphopropylbetaines): 1. Synthesis and characterization", V. M. Monroy Soto and J. C. Galin, Polymer, 1984, Vol. 25, 121-128, the disclosure of which is incorporated herein by reference in its entirety.

9) sulphohydroxypropyldiethylammonioethyl methacrylate (Formula 10)

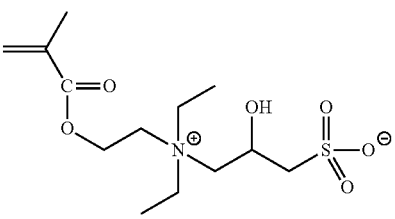

B) substituted or unsubstituted heterocyclic betaine monomers, such as:

1) sulphobetaines derived from piperazine, examples which include compounds of Formulae 11, 12 and 13,

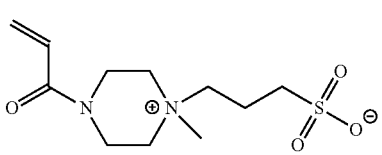

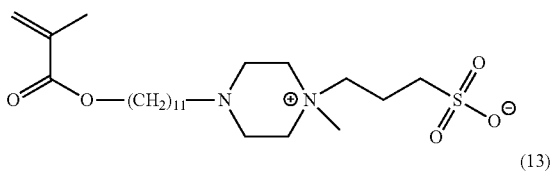

(12)

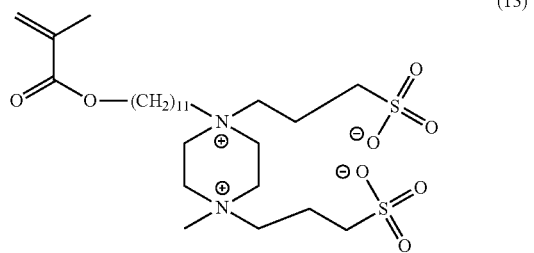

(13)

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), the disclosure of which is incorporated herein by reference in its entirety.

2) sulphobetaines derived from vinyl substituted pyridines, such as 2-vinylpyridine and 4-vinylpyridine, examples of which include:

a) 2-vinyl-1-(3-sulphopropyl)pyridinium betaine (2SPV or "SPV") (Formula 14), sold by Raschig under the name SPV:

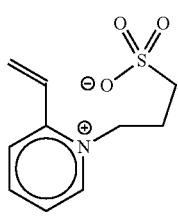

(14)

b) 4-vinyl-1-(3-sulphopropyl)pyridinium betaine ("4SPV") (Formula 15),

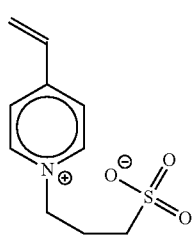

(15)

the synthesis of which is disclosed in the paper "Evidence of ionic aggregates in some ampholytic polymers by transmission electron microscopy", V. M. Castaño and A. E. González, J. Cardoso, O. Manero and V. M. Monroy, J. Mater. Res., 5 (3), 654-657 (1990), the disclosure of which is incorporated herein by reference in its entirety.

3) sulphobetaines derived from imidazoles, such as:

a) 1-vinyl-3-(3-sulphopropyl)imidazolium betaine (Formula 16)

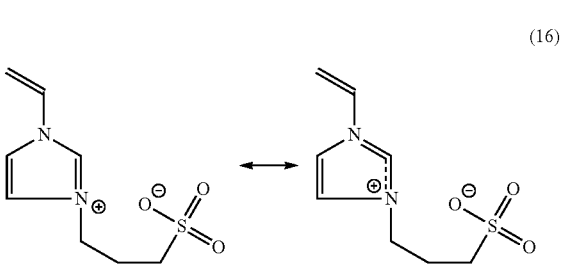

(16)

the synthesis of which is described in the paper "Aqueous solution properties of a poly(vinyl imidazolium sulphobetaine)", J. C. Salamone, W. Volkson, A. P. Oison, S. C. Israel, Polymer, 19, 1157-1162 (1978), the disclosure of which is incorporated herein by reference in its entirety.

C) substituted or unsubstituted alkylsulphonates or alkylphosphonates of dialkylammonioalkylallylics, such as:

1) sulphopropylmethyldiallylammonium betaine (17):

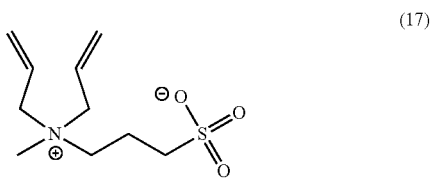

(17)

the synthesis of which is described in the paper "New poly(carbobetaine)s made from zwitterionic diallylammonium monomers", Favresse, Philippe; Laschewsky, Andre, Macromolecular Chemistry and Physics, 200 (4), 887-895 (1999), the disclosure of which is incorporated herein by reference in its entirety.

D) substituted or unsubstituted alkylsulphonates or alkylphosphonates of dialkylammonioalkylstyrenes, such as the compounds of formulae 18 and 19:

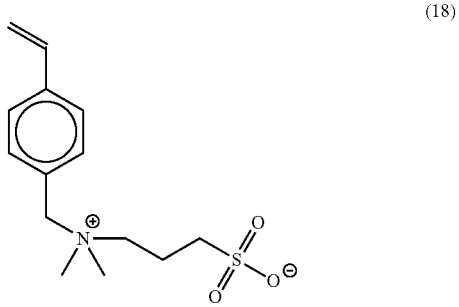

(18)

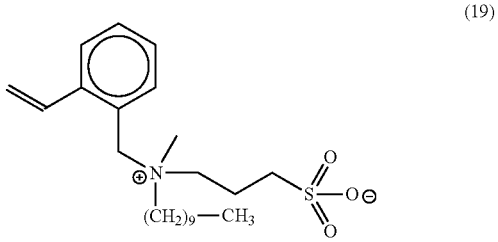

(19)

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), the disclosure of which is incorporated herein by reference in its entirety.

E) substituted or unsubstituted betaines resulting from ethylenically unsaturated anhydrides and dienes, such as the compounds of Formulae 20 and 21:

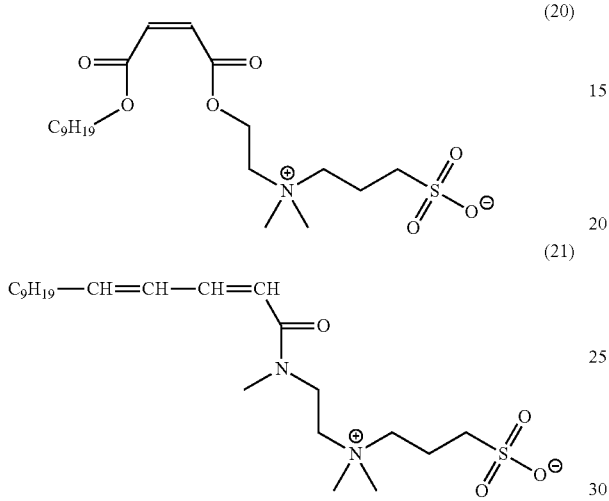

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), the disclosure of which is incorporated herein by reference in its entirety.

F) substituted or unsubstituted phosphobetaines, such as the compounds of formula 22 ("MPC") and formula 23 ("VPC"):

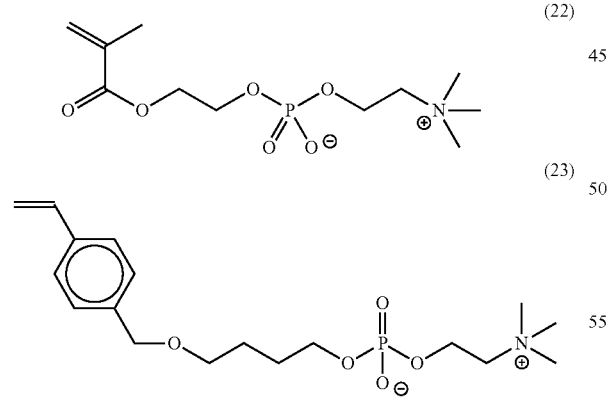

The synthesis of MPC and of VPC is described in EP 810 239 B1 (Biocompatibles, Alister et al.), the disclosure of which is incorporated herein by reference in its entirety.

In embodiments where the monomers $A_b$ described above are substituted, the substituents can be chosen from any suitable groups that will not be significantly detrimental to a desired function of these compounds, such as the ability to provide viscosification of a well bore servicing fluid. The substituents can be bonded to, for example, the cyclic moieties and/or linear carbon chain moieties of the compounds. Examples of suitable substituents can include hydroxyl groups, such as in formulae 4, 8 and 10 above, as well as $C_1$ to $C_6$ alkyl groups.

In an embodiment, the betaines can be monomers of formula 24:

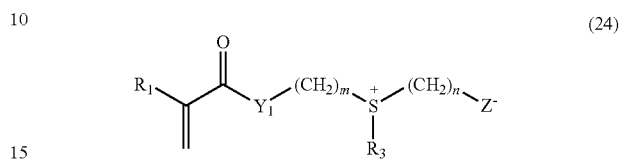

or of formula 25:

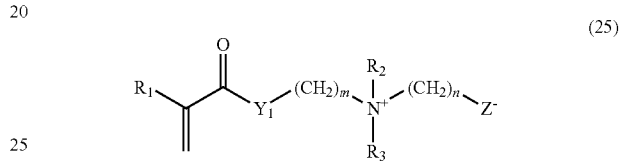

in which:
R$^1$ is hydrogen or methyl,
R$^2$ and R$^3$, which are identical or different, are hydrogen or alkyls having from 1 to 6 carbon atoms,
$Y_1$ is —O— or $NR_2$,
Z is $SO_3^-$,
m is 2 or 3, and
n is 1-6.

In an embodiment, the monomer $A_b$ can be chosen from sulphopropyldimethylammonioethyl methacrylate (SPE), sulphoethyldimethylammonioethyl methacrylate, sulphobutyldimethylammonioethyl methacrylate, sulphohydroxypropyldimethylammonioethyl methacrylate (SHPE), sulphopropyldimethylammoniopropylacrylamide, sulphopropyldimethylammoniopropylmethacrylamide (SPP), sulphohydroxypropyldimethylammoniopropylmethacrylamide (SHPP), sulphopropyldimethylammonioethyl acrylate (SPDA), sulphopropyldiethylammonioethoxyethyl methacrylate, 2-vinyl-1-(3-sulphopropyl)pyridinium betaine, 4-vinyl-1-(3-sulphopropyl)pyridinium betaine, 1-vinyl-3-(3-sulphopropyl)imidazolium betaine, sulphopropylmethyldiallylammonium betaine.

In another exemplary embodiment, monomer $A_b$ corresponds to one of the following formulae:

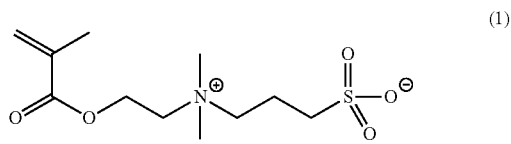

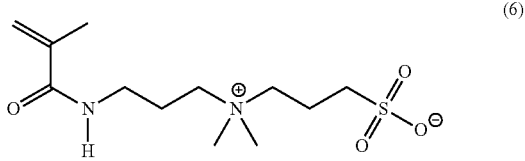

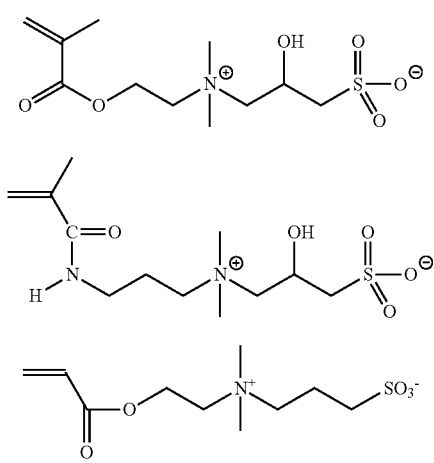

The hydrophilic nonionic monomer $B_a$ can be chosen to be one or more of: hydroxyethyl acrylate, hydroxyethyl methacrylate, hydroxypropyl acrylate and hydroxypropyl methacrylate, acrylamide (AM), methacrylamide, N-methylolacrylamide, dimethylacrylamide, dimethylmethacrylamide, polyethylene oxide, polypropylene oxide, polyethylene/polypropylene oxide copolymers (which can be any suitable type of copolymer, such as block or random copolymers), α-methacrylates, vinyl alcohol or vinylpyrrolidone.

In an embodiment, the hydrophilic nonionic monomer $B_a$ is acrylamide (AM) and/or monomer $A_b$ includes one or both of sulphopropyldimethylammonioethyl methacrylate (SPE) and sulphopropyldimethylammoniopropylmethacrylamide (SPP). In an embodiment, the hydrophilic nonionic monomer $B_a$ is acrylamide (AM) and the monomer $A_b$ is SPP.

The polymers are thus prepared by an inverse polymerization process which comprises the following stages: a1) preparation of the inverse emulsion, and a2) polymerization. In an embodiment, stage a1) is carried out by emulsification of a mixture comprising the aqueous phase comprising the monomers, the external phase and at least one emulsifying agent. The polymerization is carried out by bringing together the monomers $A_b$ and optionally the monomers $B_a$ with an initiator compound that can generate free radicals.

The temperature employed for the polymerization can be any suitable temperature. For example, the temperature can range from about ambient temperature to about 75° C., depending on the initiating system chosen.

Any suitable concentration of monomers can be employed in the polymerization process. In an embodiment, the molar ratio of the monomers $A_b$ to the monomers $B_a$ ranges from about 4:96 to about 40:60, such as from about 7:93 to about 30:70.

As the external phase, any suitable inert hydrophobic liquid can be employed. Examples of suitable hydrophobic liquids can include aliphatic and aromatic hydrocarbons and halocarbons, such as toluene, xylene, o-dichlorobenzene, perchloroethylene, hexane, heptane, kerosene, a mineral oil and Isopar M (a substance of isoparaffin type of high purity sold by Exxon Corporation). Likewise, use may be made of any suitable water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. In an embodiment, the emulsifying agent is sorbitan monooleate. Example concentrations of the emulsifying agent can range from about 0.5% to about 10%, such as from about 1% to about 5%, by weight of the emulsion.

The ratio of the aqueous phase to the external phase can vary within wide limits. For example, the water-in-oil emulsion can comprise from about 20% to about 80% of aqueous phase and thus from about 80% to about 20% of oil phase, these percentages being based on the total weight of the water-in-oil emulsion. In an embodiment, a ratio of the aqueous phase to the oil phase is about 70% to about 75% aqueous phase to about 30% to about 25% oil phase, where percentages are based on the total weight of the water-in-oil emulsion.

As discussed above, the polymerization is initiated by means of a chemical initiator comprising free radicals. This initiator can be dissolved either in the oil phase or in the aqueous phase, according to its solubility characteristics. Examples of water-soluble initiators can include 4,4'-azobis [4-cyanovaleric acid] (abbreviated to ACVA), potassium persulphate ($K_2S_2O_8$) and t-butyl hydroperoxide. Use may also be made of water-soluble initiators of redox type, such as bromate/bisulphite or metabisulphite (for example, $KBrO_3/NaHSO_3$ or $KBrO_3/NaS_2O_5$) or persulphate/bisulphite initiators. Examples of oil-soluble initiators include azobisisobutyronitrile (AIBN) and 2,2'-azobis(2,4-dimethylvaleronitrile) (ADVN).

The proportion of chemical initiator used depends on several factors. For instance, if it is necessary to maintain a desired reaction rate, the proportion of initiator can be increased as the reaction temperature falls. By adjusting the reaction temperature and the proportion of initiator, it may be possible to carry out the polymerization in a reasonable time and with a reasonable conversion of monomer to polymer, retaining the advantages of a polymerization at low temperatures.

The water-soluble zwitterionic polymers of the present invention can be used as viscosifying agents for aqueous solutions over a wide range of salinity and of temperature and as agent for modifying surfaces of particles in aqueous suspensions. For these uses/applications, the polymer can be provided in any practical form. For example, the polymer can be provided in a dry solid form or in a vectorized form, such as in a solution, an emulsion or a suspension. In an embodiment, the polymer is provided in the form of an aqueous solution. In an example, the aqueous solution can comprise from about 5 to about 50% by weight, such as from about 10 to about 30% by weight, of the polymer.

The present disclosure also relates to methods of servicing wells using compositions comprising the polymer. The polymer can help to increase the viscosity of the compositions. The polymer can be in the form of an aqueous composition comprising the inverse emulsion with the aqueous phase comprising the polymer dispersed in the form of droplets in a hydrophobic external phase and other ingredients chosen from a surfactant, an organic salt, an inorganic salt, a detergent and a thickener.

The aqueous composition can additionally comprise ionic entities, such as inorganic salts or organic salts, such as acid salts, it being possible for the salts to exhibit a surface-active or non-surface-active nature. The composition can be a "saline" composition. In an embodiment, the polymer can make it possible to increase the viscosity of compositions comprising ions, such as saline compositions, and in particular, of compositions of relatively high ionic strength. For instance, the polymer can make it possible to increase the viscosity of compositions comprising relatively large amounts of salts, such as compositions based on seawater or on brines, including produced water.

The ionic strength of the composition can vary, depending on the application. It has been found that the polymer can be effective as a thickening agent at a relatively high ionic strength. The ionic strength can, for example, be at least about 0.7 mol/l or at least about 1 mol/l, or even greater than 2 mol/l, after saturation of the salt or mixture of salts. In an embodiment, the composition can comprise a concentration of salt such that the density of the fluid is at least 10.5 pounds per gallon. Other example concentrations include at least 25 g/l of a salt (11 pounds per gallon density), such as, for example, about 35 g/l of a salt or more.

Any suitable salts can be employed in the compositions of the present application. Suitable salts include monovalent, divalent and polyvalent salts. In an embodiment, the salts can include a cation selected from alkali metal, alkaline earth metal, ammonium, manganese, and zinc cations, and an anion selected from halides, oxides, carbonates, nitrates, sulfates, acetates and formate anions. For example, the salt can be potassium chloride, sodium chloride, sodium bromide, calcium chloride, calcium bromide, zinc bromide, zinc formate, zinc oxide and mixtures of these salts.

In an embodiment, the composition can be formed of seawater or a brine comprising the polymer. In an embodiment, the composition is a brine comprising divalent ions, such as those ions formed from the disassociation of alkaline earth metal salts, such as salts of calcium or magnesium, including $CaCl_2$, $CaBr_2$, $MgCl_2$ or $MgBr_2$; or other divalent ion forming salts, such as salts of zinc (e.g., $ZnCl_2$ or $ZnBr_2$). The concentration of the divalent ions in the brine can vary. In an example, the brine can comprise divalent salts in an amount greater than about 25% by weight of the total salts in the brine.

In an embodiment, the composition can comprise produced water. The produced water can have a relatively high total dissolved solids ("TDS") content. Examples of TDS content can range from about 50,000 mg/L up to saturation, such as about 100,000 mg/L to about 300,000 mg/L, based on the total volume of the composition.

The elements contained in the produced water can vary significantly depending on the source of the water. In an embodiment, the produced water can comprise at least one of calcium, potassium, iron, magnesium, strontium, sodium and chloride. Examples of suitable dissolved calcium concentrations can range from about 5000 mg/L to saturation, such as about 10,000 or 15,000 mg/L to about 50,000 mg/L. Examples of suitable dissolved potassium concentrations can range from about 1000 mg/L to saturation, such as about 2000 or 3000 mg/L to about 10,000 mg/L. Examples of suitable dissolved iron concentrations can range from about 2 mg/L to saturation, such as about 5 or 10 mg/L to about 100 mg/L. Examples of suitable dissolved magnesium concentrations can range from about 5 mg/L to saturation, such as about 100 or 1000 mg/L to about 2500 mg/L. Examples of suitable dissolved strontium concentrations can range from about 5 mg/L to saturation, such as about 100 or 1000 mg/L to about 2500 mg/L. Examples of suitable dissolved sodium concentrations can range from about 10,000 mg/L to saturation, such as about 25,000 or 50,000 mg/L to about 100,000 mg/L. Examples of suitable dissolved chloride concentrations can range from about 10,000 mg/L to saturation, such as about 50,000 or 100,000 mg/L to about 300,000 mg/L.

In addition to those listed above, produced water can include a variety of other species. Examples of such species include barium, boron, copper, manganese, molybdenum, phosphorus, silica, zinc, aluminum, sulfate, carbonate, and bicarbonate.

The well servicing fluid composition can comprise any suitable amount of produced water. In an embodiment, the produced water can be 50% by weight or more of the well servicing fluid. For example, the produced water can range from about 75% to about 99.9% by weight of the composition.

In an embodiment, the well servicing fluid comprises at least one surfactant chosen from alcohol ethoxylates, $C_4$ to $C_{12}$ alcohols and ethoxylated propoxylated alcohols.

In an embodiment, the alcohol ethoxylates can be compounds of the general formula: $R(OC_2H_4)_nOH$, where R is an alkyl group and n ranges from about 1 to about 10. Suitable examples of alcohol ethoxylates include compounds of the formula $CH_3(CH_2)_xCH_2(OCH_2CH_2)_nOH$, where x ranges from 4 to 8; and n is an integer of 1, 2 or 3. An example of a commercially available alcohol ethoxylate is ALPHONIC®810-2 Alcohol Ethoxylate, available from Sasol North America Inc., located in Houston, Tex.

In an embodiment, the primary alcohols comprise a linear $C_2$ to $C_{12}$ alcohol, such as a linear $C_6$ alcohol. An example of a commercially available alcohol is ALFOL® 6, which is a hexanol available from Sasol North America Inc.

In an embodiment, the ethoxylated propoxylated alcohols are linear alcohols having from 4 to 16 carbon atoms, such as linear ethoxylated propoxylated $C_8$-$C_{10}$ alcohols. An example of one such commercially available alcohol is ANTAROX® BL 240, available from Rhodia Inc., having North American headquarters in Cranbury, N.J.

The above surfactants can be employed at any suitable concentration that will result in a desired viscosity. Examples of suitable concentrations can range from about 0.5 gallon per thousand ("gpt") or more, such as about 1 gpt to about 20 gpt, or about 2 gpt to about 8 gpt.

The one or more surfactants can be mixed in any suitable order with the other ingredients of the well servicing fluid. For example, the surfactants can be added to the mixture either separately or together.

In an embodiment, the surfactants can be blended to form a preblend prior to forming the well servicing fluid. The preblend can comprise, for example, the alcohol ethoxylates, the $C_4$ to $C_{12}$ alcohols and the ethoxylated propoxylated alcohols. The preblend can be made at any time before forming the well servicing fluid.

Any suitable concentration of surfactants can be employed in the preblend. For example, the preblend can comprise about 50% to about 90% by weight ethoxylated propoxylated alcohols, such as about 65% to about 85% by weight; about 2% to about 20% by weight $C_4$ to $C_{12}$ alcohols and about 2% to about 20% by weight alcohol ethoxylates.

By employing one or more of the surfactants discussed above, it may be possible to reduce process time when mixing the zwitterionic polymers in the well servicing fluids of the present disclosure, compared to the time it would take to mix the polymers without a surfactant. In an embodiment, mixing times can be reduced sufficiently to allow for on-the-fly mixing. Examples of suitable mixing times for on-the-fly mixing processes can range from about 1 to about 2 minutes or less. Longer mixing times can be employed when using batch mixing processes, if desired. The surfactants of the present application may, in some formulations, allow the well servicing fluids to reach a desired viscosity relatively quickly, such as, for example, within a mixing time suitable for on-the-fly processes. For example, in some instances it may be possible to increase viscosity from a range of about 7 cP to about 10 cP at ambient conditions to a range of about 20 cP to about 120 cP, depending on the concentration of surfactant and the type of brine.

While not intending to be limited by theory, it is believed that decreases in mixing times may, at least in part, be due to the surfactants of the present application facilitating the inverting of the polymer emulsions in a timely fashion to better associate the polymer with the ions of the brine during mixing. For example, the hydrophobic external phase and aqueous dispersion of the inverse polymer emulsion may flip so that the hydrophobic phase becomes dispersed in the aqueous phase. With the polymer in the aqueous external phase, mixing of the polymer emulsion with the aqueous brine can occur more quickly.

In an embodiment, the well servicing fluid can comprise ferric chloride ($FeCl_3$), in addition to the at least one surfactant. It has been found that, in some instances, the ferric chloride can decrease the time it takes to reach a suitable viscosity. It may be that the ferric chloride further enhances the effect of flipping the emulsion, thereby allowing inversion and mixing of the polymer emulsion in the brine to occur faster than it would otherwise occur without the ferric chloride.

The ferric chloride can be included in any suitable amount that will provide the desired enhanced effect. An example concentration of ferric chloride in the well servicing fluid ranges from about 50 ppm to about 150 ppm.

Other surfactants that are soluble in the brine or produced water used in the well servicing fluid can also be employed in addition to or as an alternative to those listed above. Examples of such surfactants are the ammonium salts of polyarylphenyl ether sulfate, such as the ammonium salt of tristyrylphenol ethoxylate sulfate, which is sold under the tradename SOPROPHOR 4 D 384, by RHODIA. Surfactants other than ammonium based salts can also be employed.

In an embodiment, all or a portion of the surfactant can be introduced into the well servicing fluid with the polymer emulsion, including surfactants used during the preparation of the polymer. In an embodiment, surfactant can be added to the well servicing fluid in addition to the surfactant employed during preparation of the polymer. Alternatively, all of the surfactant can be added separately from the polymer.

The total amount of surfactant included in the well servicing fluid composition can vary depending upon the use of the composition. For example, the amount can range from the values indicated above to about 20%, by weight, such as from about 5% to about 15% by weight of surfactant with respect to the polymer.

The amount by weight of polymer in the compositions can depend on the rheological behaviour desired and/or on the thickening strength desired for the compositions and on the possible presence of other compounds, in particular ionic compounds, such as salts. In an embodiment, the amount by weight can be greater than about 0.01% by weight, with respect to the composition, for example greater than about 0.1% by weight and often greater than or equal to about 0.5% or about 1% by weight. The amount will generally be less than or equal to about 20% by weight, such as about 10% by weight. Advantageous thickenings may in some instances be observed at polymer concentrations ranging from about 0.1% to about 1% by weight, and/or from about 1% to about 2% by weight, and/or from about 2% to about 3% by weight, and/or from about 3% to about 4% by weight, and/or from about 4% to about 5% by weight.

As discussed above, the compositions of the present application can be employed as a well bore servicing fluid for oil wells and natural gas wells, including subsea wells. In an embodiment, the zwitterionic polymers and surfactants of the present disclosure are used as viscosifying agents in produced water or other brine formulations employed in well bores of oil and gas wells. Examples of such fluids include: drilling fluids, gravel packing fluids, fracturing fluids, frac packing fluids, completion fluids, and fluids used for completion pills.

Thus, the present disclosure can be directed to a method of drilling an oil or natural gas well bore in which the fluids of the present application are utilized as a drilling fluid. In an embodiment, well bore servicing fluids of the present disclosure comprising an aqueous saline solution, such as produced water or other brines, a zwitterionic polymer and a surfactant, can be circulated through a well bore as it is drilled into a subterranean formation. The drilling fluid can carry drill cuttings created by the drilling process in a return flow stream back to the well drilling platform. The circulation of the drilling fluid can be terminated after drilling is stopped. Then a string of pipe, such as, for example, an annular pipe casing, can be run into the well bore. In an optional second stage of the process, the well bore servicing fluid of the present application can then be circulated through the well bore to remove additional drill cuttings. For example, the well bore servicing fluid can be pumped downwardly through the interior of the pipe and upwardly through an annulus, which is located between the exterior of the pipe and the walls of the well bore, to thereby carry the cuttings out of the well bore.

In an embodiment, the drilling fluid used during the second stage of the process may be different than the drilling fluid used during the drilling stage. For example, the well bore servicing fluids of the present disclosure can be employed during the drilling stage, while a second drilling fluid other than the well bore servicing fluids of the present disclosure can be employed during the second stage, or vice versa.

The well bore servicing fluids of the present application can be employed as gravel packing fluids. In an embodiment, a well bore servicing fluid comprising an aqueous saline solution, such as produced water or other brines, a zwitterionic polymer and a surfactant can further comprise gravel suspended therein. As part of the gravel packing process, a permeable screen may be placed against the face of the subterranean formation, followed by pumping the well bore servicing fluid comprising the gravel into the annulus of the well bore such that gravel becomes packed against the exterior of the screen.

The well bore servicing fluids of the present application can also be employed as fracturing fluids. In an embodiment, a well bore servicing fluid of the present disclosure comprising a zwitterionic polymer, a surfactant and an aqueous saline solution, such as produced water or other brines, can be used to fracture a subterranean formation. The well bore servicing fluid is pumped into the well bore at a rate and a pressure sufficient to form fractures that extend into the subterranean formation, providing additional pathways through which fluids being produced can flow into the well bores. In an embodiment, the well bore servicing fluid can include a proppant. Well known propants used in fracturing include graded sand, bauxite, or resin coated sand, any of which may be suspended in the fracturing fluid. The proppant becomes deposited into the fractures and thus holds the fractures open after the pressure exerted on the fracturing fluid has been released.

The compositions of the present disclosure, whatever the use, can comprise dispersed liquid particles (emulsified droplets) or dispersed solid particles. Liquid particles can, for example, be synthetic oils (for example silicone oils) or oils of vegetable or mineral origin. The solid particles can in particular be sand, density-modifying particles, debris and/or polymeric particles. The polymer can promote the suspending of these particles during the time necessary for the use of the composition and/or during a storage time. It can also alternatively contribute to easy transportation of the particles, in order to position them at or to move them to an appropriate spot.

The fluids of the present disclosure can include additional ingredients to modify the rheological and chemical properties of the fluid. Clayey materials such as bentonite, attapulgite, sepiolite or other material commonly used in drilling fluids can be included to provide drilling muds to lubricate the drill strings and suspend drill cuttings. The fluids can also include buffering agents or pH control additives. Buffering agents can be used in well bore servicing fluids to maintain the desired pH of the fluid. If the pH of the well bore servicing fluid becomes too low, severe degradation of the included polymers, such as the viscosifying agents, may result. Examples of suitable buffering agents include, but are not limited to: sodium phosphate, sodium hydrogen phosphate, boric acid-sodium hydroxide, citric acid-sodium hydroxide, boric acid-borax, sodium bicarbonate, ammonium salts, sodium salts, potassium salts, dibasic phosphate, tribasic phosphate, lime, slaked lime, magnesium oxide, basic magnesium carbonate, calcium oxide and zinc oxide.

The temperature and the pressure of the fluid can vary according to the use which is made of the fluid and its environment. The polymer can remain effective over a relatively wide range of temperatures, including under conditions requiring relatively high temperatures, in particular in the fields of oil and/or gas extraction. For example, the composition can have a temperature ranging from about 20° C. to relatively high temperatures, such as greater than or equal to 50° C., greater than or equal to 70° C., greater than or equal to 100° C., greater than or equal to 150° C. or greater than or equal to 180° C. The pressure can be any suitable pressure, such as, for example, atmospheric pressure or a greater pressure.

A reduced specific viscosity can be measured by dissolving the polymer in a 20% by weight aqueous NaCl solution. The intrinsic viscosity $\eta$ can then be obtained by linear extrapolation of the reduced specific viscosity to zero concentration of polymer. The slope of this extrapolation is equal to $k'(\eta)^2$, k' being the Huggins coefficient. This method of calculating $\eta$ is described in detail in the publication Polymer Handbook (4$^{th}$ edition), J. Brandrup, E. H. Immergut and E. A. Grulke, Wiley (1999), the description of calculating $\eta$ in the Polymer Handbook being hereby incorporated by reference in its entirety. The specific viscosity makes it possible to have indirect access to the molecular weights of greater than approximately 2 000 000, which cannot be directly determined experimentally. In an embodiment of the present application, the zwitterionic polymers exhibit an intrinsic viscosity of about 600 ml/g or greater, such as about 1000 ml/g or greater, where the reduced specific viscosity is measured by dissolving the polymer in a 20% by weight aqueous NaCl solution, as described above.

Other characteristics or advantages of the invention may become apparent in the light of the examples which follow, given by way of illustration without a limiting nature.

EXAMPLES

Example 1

(Comparative)—Solution Polymerization-Poly(Acrylamide/SPP) 90/10 mol/mol

Copolymerization 82.4 g of 50% acrylamide in water, 18.8 g of SPP and 94.4 g of water are added to a 500 ml three-necked round-bottom flask equipped with a nitrogen inlet, a mechanical stirrer (anchor), a reflux condenser and temperature regulation via a thermostatically controlled bath of oil. The temperature of the reaction medium is brought to 65° C. while flushing with nitrogen. 0.3 g of sodium persulphate dissolved in 5 g of water is added at 65° C. The temperature of the reaction medium is maintained for 24 h. The combined mixture is subsequently cooled to ambient temperature. The final product exists in the form of a translucent gel.

The molar mass of the polymer obtained can be conventionally adjusted by modifying the amount of initiator introduced, the reaction temperature or the addition of a transfer agent. The concentrations of initiator and the corresponding molar masses, determined by steric exclusion chromatography (+CVG ref) are referenced in Table 1 below:

TABLE 1

| Reference | Concentration of initiator with respect to the monomers | Mw by chromatography (kg/mol) |
|---|---|---|
| Example 1-1 | 0.2% + transfer agent | 63 |
| Example 1-2 | 5% | 370 |

Example 2

Inverse Emulsion Polymerization-Poly(Acrylamide/SPP) 90/10 mol/mol

The synthesis takes place in two stages: preparation of an emulsion comprising the monomers and the surfactants, followed by copolymerization.

Preparation of an Emulsion Comprising the Monomers and the Surfactants:

110.2 g of Shellsol D80 (Shell Chemicals), 18.5 g of G946 (ICI), 9.3 g of Rhodasurf LA-3 (Rhodia) and 4.9 g of Hypermer B261 (Uniquema) are added to a 250 ml glass beaker with magnetic stirring. Stirring is maintained until a clear solution is obtained (Mixture 1). 199.8 g of 50% acrylamide in water, 91.3 g of 50% SPP in water, 0.2 g of Versene 100 (Dow) and 2.9 g of sodium sulphate are added to a 500 ml glass beaker with magnetic stirring. Stirring is maintained until a clear solution is obtained (Mixture 2). Mixture 2 is subsequently introduced into Mixture 1 with magnetic stirring. Stirring is maintained for 5 min and then all the liquid is added to a mixer of rotor/stator type in order to be mixed for 10 s (6000 revolutions/min). The stable emulsion is thus obtained.

Copolymerization

All the emulsion prepared immediately above is added to a 1 liter jacketed glass reactor equipped with a nitrogen inlet, a mechanical stirrer, a reflux condenser and temperature regulation via a thermostatically controlled bath. The temperature of the reaction medium is brought to 45° C. while flushing with nitrogen. 0.2 g of Trigonox 25C75 (Akzo Nobel) is added at 45° C. An additional 0.2 g of Trigonox 25C75 is added 4 hours after this addition. The temperature of the reaction medium is subsequently brought to 55° C. for 3 h. The combined mixture is cooled to ambient temperature.

The final emulsion exists in the form of a translucent and slightly coloured liquid which is not very viscous.

By following the procedure described above, polymers of variable molar masses are produced by modifying the level of initiator. However, for numerous tests, the molar masses are too high to be measured by steric exclusion chromatography. The molar masses are likely significantly greater than $3 \times 10^6$ g/mol. Furthermore, copolymers with variable acrylamide/SPP ratios are also synthesized. The characteristics of the products are referenced in Table 2 below:

TABLE 2

| Reference | Operating conditions | Mw by chromatography (kg/mol) |
|---|---|---|
| Example 2-1 | Concentration initiator = 0.1 mol % vs monomers, T = 65° C. [Am]/[SPP] = 90/10 mol/mol | 2000 |
| Example 2-2 | Concentration initiator = 0.05 mol % vs monomers, T = 65° C. [Am]/[SPP] = 90/10 mol/mol | not measurable |
| Example 2-3 | Concentration initiator = 0.05 mol % vs monomers, T = 55° C. [Am]/[SPP] = 90/10 mol/mol | not measurable |
| Example 2-4 | Concentration initiator = 0.1 mol % vs monomers, [Am]/[SPP] = 90/10 mol/mol | not measurable |
| Example 2-5 | Concentration initiator = 0.02 mol % vs monomers, [Am]/[SPP] = 90/10 mol/mol | not measurable |
| Example 2-6 | Concentration initiator = 0.1 mol % vs monomers, [Am]/[SPP] = 98/2 mol/mol | not measurable |
| Example 2-7 | Concentration initiator = 0.1 mol % vs monomers, [Am]/[SPP] = 95/5 mol/mol | not measurable |
| Example 2-8 | Concentration initiator = 0.1 mol % vs monomers, [Am]/[SPP] = 80/20 mol/mol | not measurable |
| Example 2-9 | Concentration initiator = 0.1 mol % vs monomers, [Am]/[SPP] = 70/30 mol/mol | not measurable |
| Example 2-10 | Concentration initiator = 0.1 mol % vs monomers, [Am]/[SPP] = 50/50 mol/mol | not measurable |

Example 3

Evaluations

The viscosities of the polymer solutions are evaluated using an AR2000 rheometer (TA Instrument, Surrey, United Kingdom) provided with geometry of Couette type (internal radius=14 mm; external radius=15 mm and height=42 mm).

Molar Masses

The viscosity contributed by the dissolution of a polymer is represented by its intrinsic viscosity (the linear extrapolation to zero concentration of the reduced specific viscosity)

$$[\eta] = \lim_{c \to 0} \frac{\eta - \eta_0}{\eta_0 c},$$

where $\eta$ is the viscosity of the solution comprising the polymer, $\eta_0$ is the viscosity of the solvent and c is the concentration of polymer.

The intrinsic viscosity, for a polymer chemical composition under given solvent conditions, is related to the molar mass by the Mark-Houwink relationship. See Polymer Handbook (4$^{th}$ edition), J. Brandrup, E. H. Immergut and E. A. Grulke, Wiley (1999), the description of the Mark-Houwink relationship in the Polymer Handbook being hereby incorporated by reference in its entirety.

$[\eta] = KM^a$, with "K" and "a" constants which depend on the chemical composition of the polymer and on the solvent and temperature.

The polymers of Examples 1 and 2 are purified and dried and then dissolved in a 20% by weight NaCl solution at different concentrations of polymer. The reduced specific viscosity curves as a function of the polymer concentration make it possible to determine the intrinsic viscosity given in Table 3 below.

TABLE 3

| | Reference | Mw by chromatography (kg/mol) | Intrinsic viscosity (ml/g) |
|---|---|---|---|
| Solution | Example 1-1 | 63 | 37 |
| Solution | Example 1-2 | 370 | 112 |
| Inverse emulsion | Example 2-1 | 2000 | 320 |
| Inverse emulsion | Example 2-2 | not measurable | 470 |
| Inverse emulsion | Example 2-3 | not measurable | 550 |
| Inverse emulsion | Example 2-4 | not measurable | 850 |
| Inverse emulsion | Example 2-5 | not measurable | 1100 |

Rheology in Saline Solutions

The copolymers described in Examples 1 and 2 are used in the solutions of variable salinities described in Table 4 below.

TABLE 4

| Reference | Composition (w salt per 1 kg of solution) | Density | Viscosity at 25° C. (mPa · s) |
|---|---|---|---|
| ZnBr$_2$/CaBr$_2$ | ZnBr$_2$ 550 g/CaBr$_2$ 230 g | 2.3 | 25.2 |
| CaCl$_2$/CaBr$_2$ | CaCl$_2$ 230 g/CaBr$_2$ 330 g | 1.7 | 5.9 |
| 45% NaBr | NaBr 446 g | 1.5 | 2.4 |
| 20% NaCl | NaCl 200 g | 1.15 | 1.48 |
| 10% NaCl | NaCl 100 g | 1.07 | 1.2 |
| 5% NaCl | NaCl 50 g | 1.03 | 1.0 |
| Purified water | / | 0.99 | 0.95 |

The polymers are purified and dried. The powders obtained are dissolved at 10 g/l with magnetic stirring. The viscosities are measured 72 h after the preparation of the samples and the values obtained are collated in Table 5 below.

TABLE 5

Relative viscosity at a polymer concentration at 10 g/l (gradient of 1 s$^{-1}$ at 25° C.).

| | Reference | Intrinsic viscosity (ml/g) | Relative viscosity: Purified water | Relative viscosity: 5% NaCl | Relative viscosity: 10% NaCl | Relative viscosity: 20% NaCl |
|---|---|---|---|---|---|---|
| Solution | Example 1-1 | 37 | 1.3 | 1.5 | 1.3 | 1.4 |
| Solution | Example 1-2 | 112 | 2.5 | 2.3 | 2.1 | 2.4 |
| Inverse emulsion | Example 2-1 | 320 | 14 | 10 | 9.2 | 11 |
| Inverse emulsion | Example 2-2 | 470 | 16 | 18 | 19 | 22 |
| Inverse emulsion | Example 2-3 | 550 | 51 | 60 | 72 | 82 |
| Inverse emulsion | Example 2-4 | 850 | 59 | 98 | 102 | 108 |
| Inverse emulsion | Example 2-5 | 1100 | 100 | 179 | 165 | 196 |

These results demonstrate that the viscosifying power of the polymers according to the invention increases as the molar mass (and the intrinsic viscosity) increases and as the salinity increases.

Direct Dispersion

The polymers of Example 2, synthesized by inverse emulsion polymerization with the composition AM/SPP (90/10), are dispersed directly in the brines.

5% by weight of surfactant Soprophor 4D384 (Rhodia) are added to the inverse emulsion 5 minutes before mixing with the brines. The amount necessary to obtain 10 g/l of polymer is dispersed in the brines. These preparations are, in a first step, stirred vigorously by hand for a few moments and then stirred with a magnetic bar until they are used.

Relative viscosities at a polymer concentration of 10 g/l are measured here 24 h after the preparation of the samples (gradient of 1 s$^{-1}$ at 25° C.) and the values are collated in Table 6 below.

TABLE 6

| Reference | Intrinsic viscosity (ml/g) | Relative viscosity: NaBr | Relative viscosity: CaCl$_2$/CaBr$_2$ | Relative viscosity: ZnBr$_2$/CaBr$_2$ |
|---|---|---|---|---|
| Example 2-1 | 320 | 17 | 25 | 115 |
| Example 2-2 | 470 | 59 | 110 | 529 |
| Example 2-3 | 550 | 77 | 217 | 549 |
| Example 2-4 | 850 | 114 | 437 | 797 |

These results demonstrate that the viscosifying power of the polymers according to the invention is very high in brines highly concentrated in salt.

High-Temperature Stability

Solutions of polymers comprising variable levels of SPP are prepared according to the protocol described in Example 2 at a concentration by weight of 0.5% in the brine ZnBr$_2$/CaBr$_2$.

The viscosities of these solutions are measured after mixing at ambient temperature and then after ageing in pressurized cells (acid digestion bombs—Parr instruments) in a rolling oven at 160° C. for 6 h.

The aged solutions may exhibit solid residues; if appropriate, these solutions are filtered through a 100 μm cloth. The viscosities are then measured at 90° C. and the values are collated in Table 7 below.

TABLE 7

Relative viscosity at a polymer concentration of 0.5% by weight (gradient of 100 s$^{-1}$ at 90° C.).

| | SPP level (mol %) | Relative viscosity: initial solution | Relative viscosity: solutions aged at 160° C. | |
|---|---|---|---|---|
| Example 2-6 | 2 | 51 | 1.0 | Precipitate |
| Example 2-7 | 5 | 53 | 1.1 | Precipitate |
| Example 2-4 | 10 | 60 | 9.7 | Homogeneous solution |
| Example 2-8 | 20 | 33 | 8.8 | Homogeneous solution |
| Example 2-9 | 30 | 13.5 | 11.2 | Homogeneous solution |
| Example 2-10 | 50 | 5.5 | 4.8 | Homogeneous solution |

These results demonstrate that the high-temperature stability of the polymers according to the invention dissolved in brines is directly related to the level of SPP incorporated in the polymer. In this instance, a minimum level of 10 mol % is necessary to maintain the homogeneity of the solution if the latter is exposed for a long time to high temperatures.

Example 4

Optimization of Polymer-Surfactant Ratio

Figure 2:
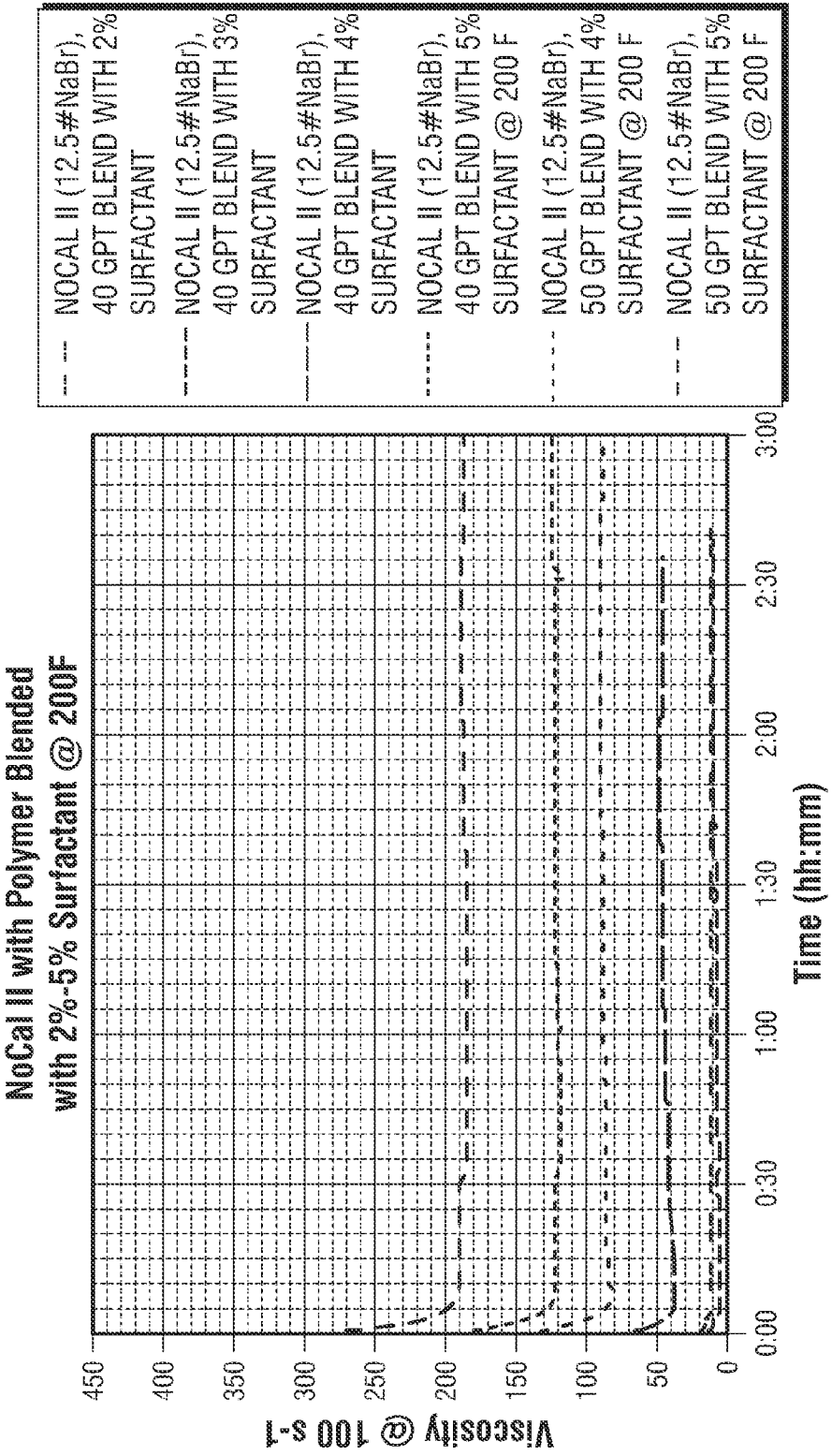
Figure 3:
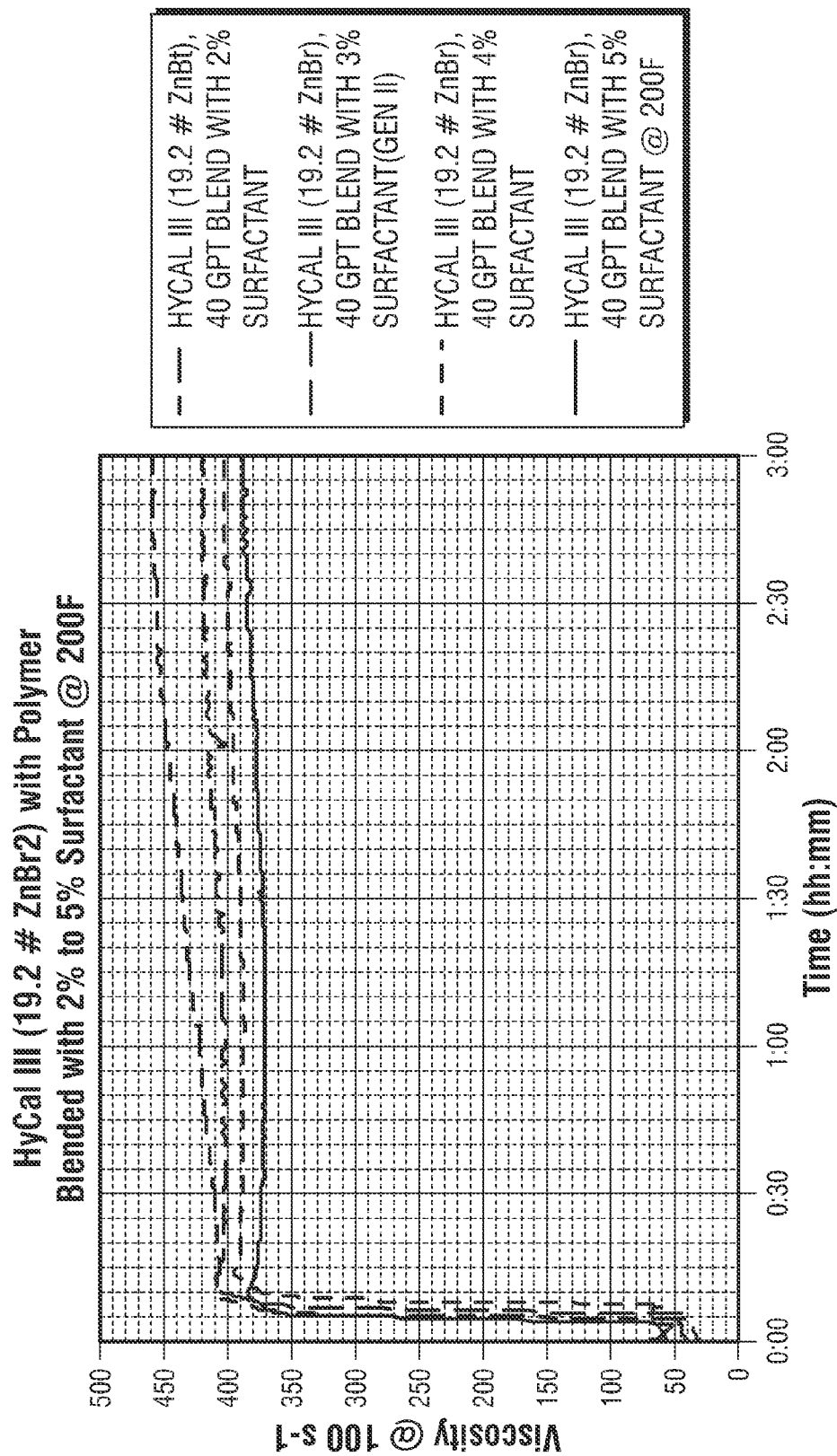

A surfactant, SOPROPHOR 4 D 384, made by Rhodia, was first dissolved into the polymer of Example 2-5 (polymer concentration of 30 wt. %), above, at varying concentrations—2% to 5% by total volume. Next, 40 gpt of each blend was tested in HyCal II (14.2 ppg CaBr$_2$), NoCal II (11.0-12.5 ppg NaBr), and HyCal III (19.2 ppg ZnBr$_2$). The polymer/surfactant blend was added to the different brines and allowed to hydrate for 15 minutes at a constant shear rate of approximately 700 RPM using a standard servodyne mixer. After that, the samples were tested at 200° F. using a Chandler 5550 viscometer. From the data obtained, it was determined that the 5% surfactant concentration was optimum. The optimum concentration was also confirmed to be 5% surfactant concentration after testing with 50 gpt of polymer loading with 4 and 5% surfactant concentration. See FIGS. 1-3.

Example 5

Figure 4:
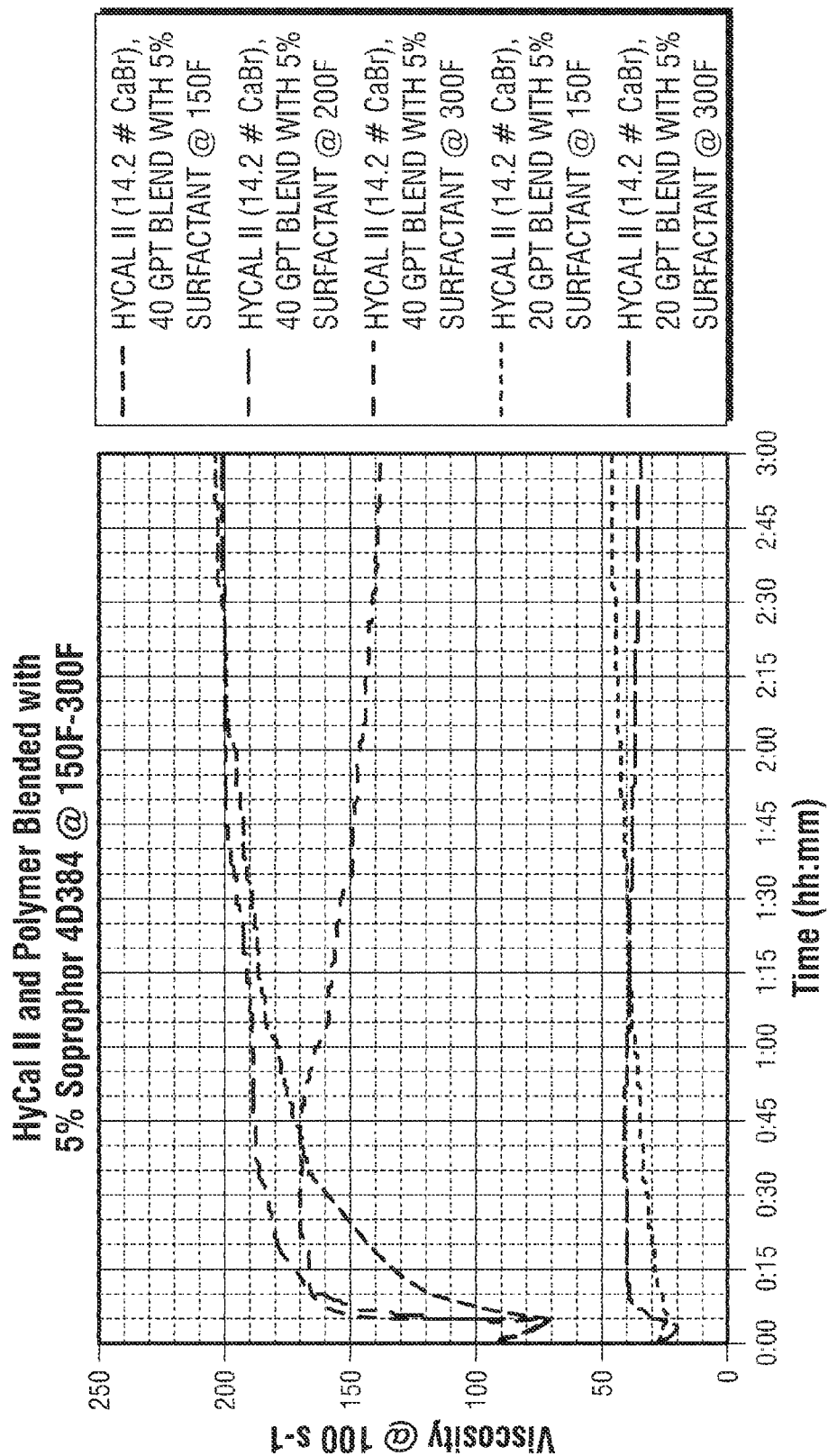
Figure 5:
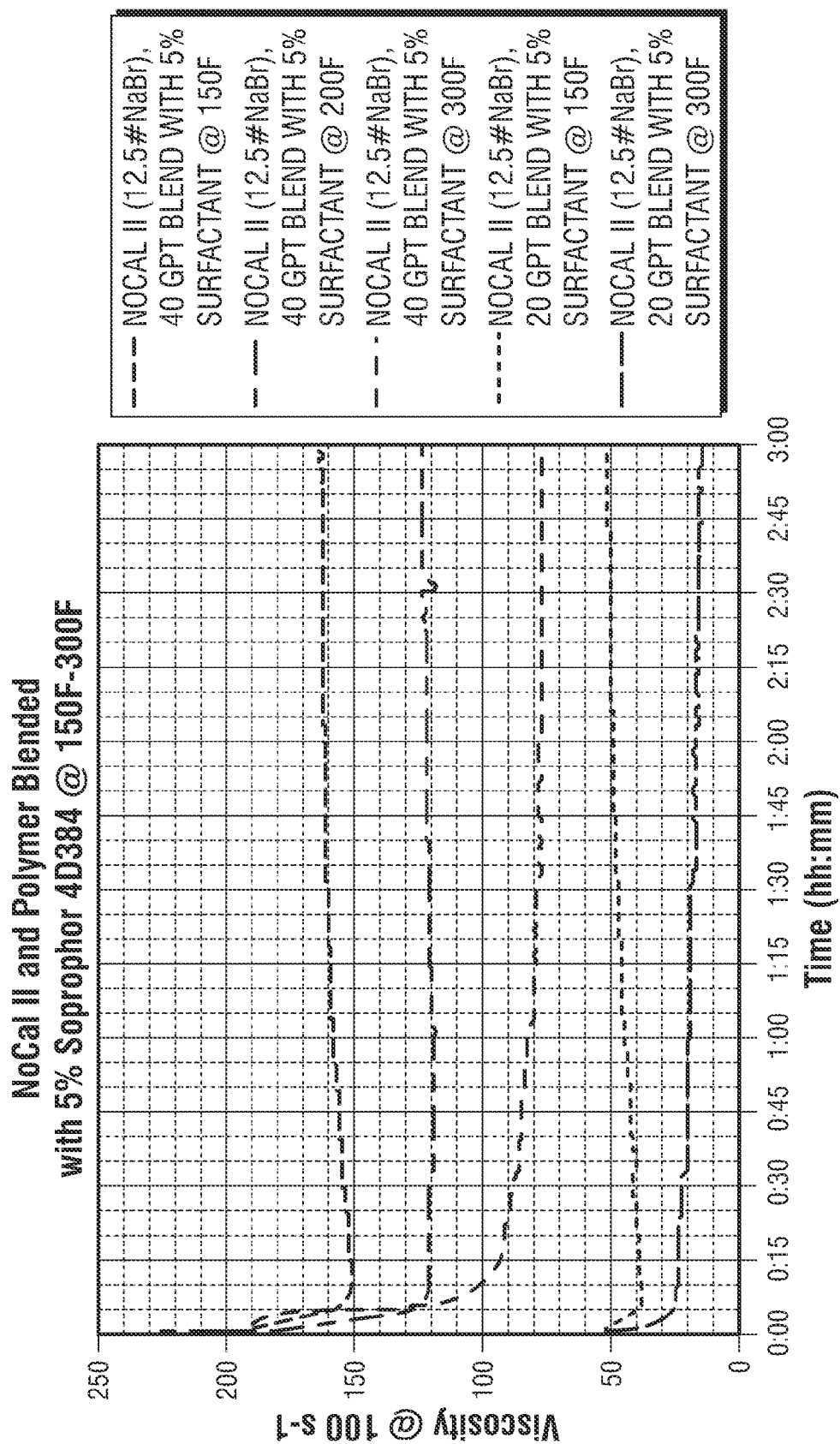
Figure 6:
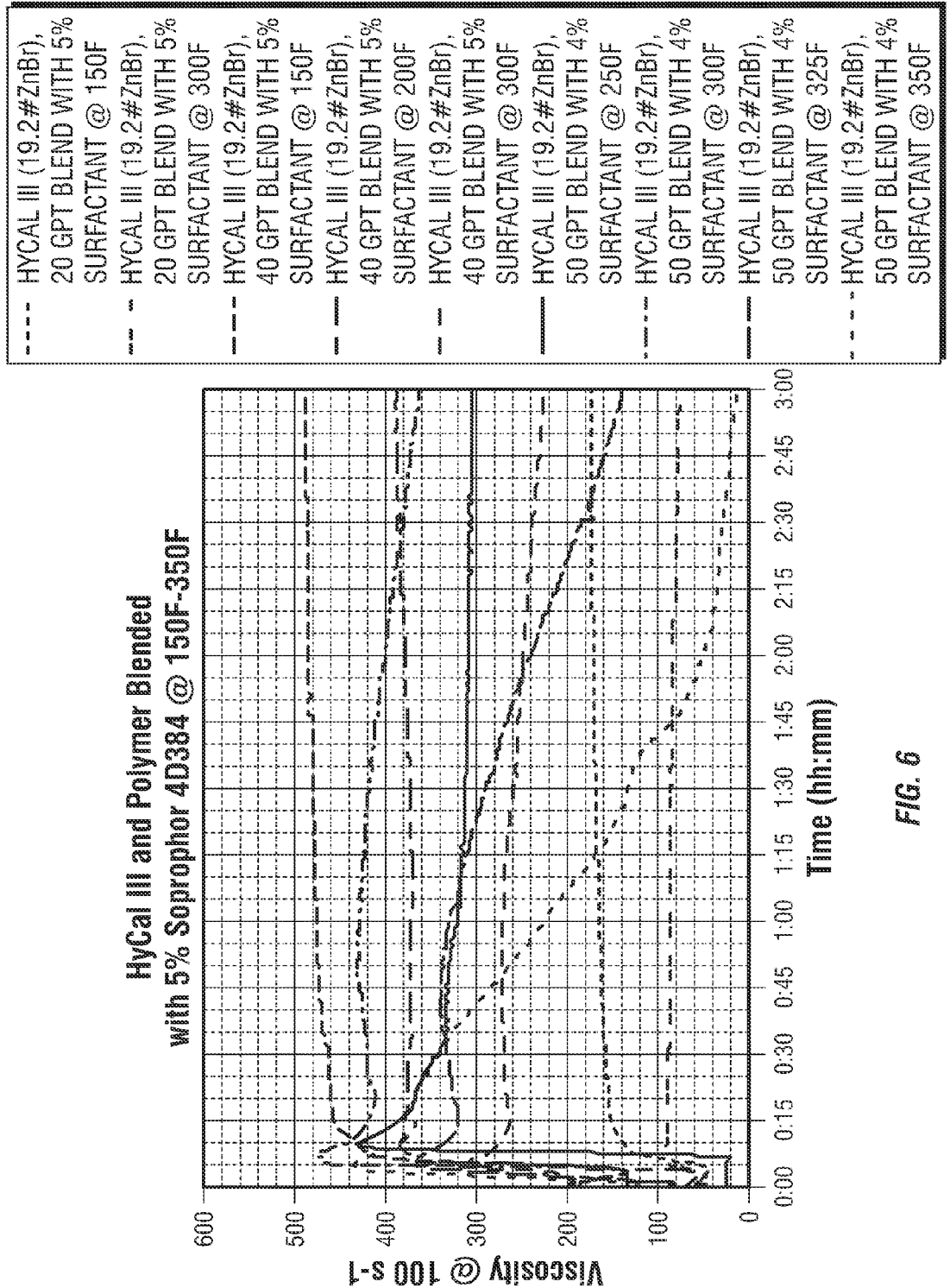

The 5% polymer/surfactant blend of Example 4 was then tested at various temperatures (150° F.-350° F.) at loadings of 40 gpt to 50 gpt with all three brines (HyCal II (14.2 ppg CaBr$_2$), NoCal II (11.0-12.5 ppg NaBr), and HyCal III (19.2 ppg ZnBr$_2$)). The polymer blend was added to the various brines and allowed to hydrate for 15 minutes. The samples were then tested at the different temperatures using a Chandler 5550 Viscometer. The resulting data for HyCal II, NoCal II and HyCal III is respectively shown in FIGS. 4, 5 and 6. From the data it was determined that the brine viscosifier is stable up to about 350° F. for 1 hour. All other temperatures showed stability for 3 hours. The data shows that good viscosities were achieved at the various temperatures for all three brines.

Example 6

Blend of Surfactants

All of the fluids in Examples 6 to 11 below were prepared by the following procedure: 250 ml of base brine was added to a 16 oz jar. The jar was placed under an overhead stirrer at 1000 rpm. Once a vortex was established, the concentration of BVP-1 was added. Then the surfactant blend was added. Finally, a breaker was added if necessary. The resulting composition was mixed for 1 minute and then removed from the overhead stirrer for testing. Testing was performed using an OFITE M900 viscometer for room temperature measurements. A Chandler 5550 HPHT viscometer was used for high temperature measurements.

Figure 7:
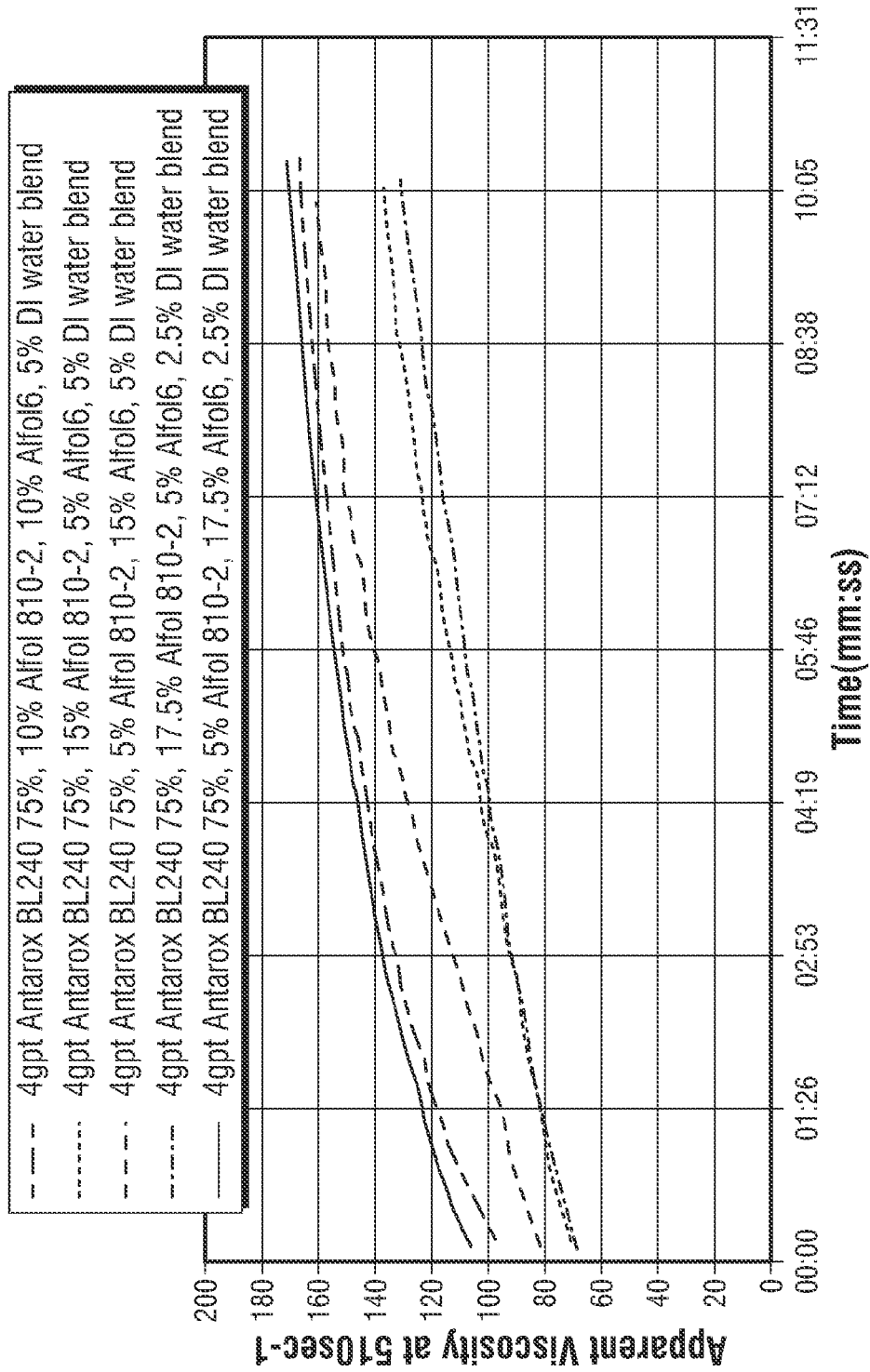

The following 5 blends of surfactants were each added at a concentration of 4 gpt to a mixture of 11 ppg CaCl$_2$ and 50 gpt BVP-1 in the manner discussed above. The results of testing are shown in FIG. 7. As shown by the data, Blend 4 provided the highest apparent viscosity of the blends tested.

All concentrations in Table 8 are in weight percent based on the total weight of the surfactant blend.

TABLE 8

| Surfactant Blend | Concentration (% By Weight) | | | | |
|---|---|---|---|---|---|
| Ingredients | Blend 1 | Blend 2 | Blend 3 | Blend 4 | Blend 5 |
| ANTAROX BL-240 | 75% | 75% | 75% | 75% | 75% |
| ALFOL 810-2 | 15% | 5% | 17.5% | 5% | 10% |
| ALFOL 6 | 5% | 15% | 5% | 17.5% | 10% |
| DI Water | 5% | 5% | 2.5% | 2.5% | 5% |

Similar testing was also performed for two other types of brines: 13 ppg CaCl$_2$/CaBr$_2$ and 12 ppg NaCl/NaBr. Blend 4 provided the highest apparent viscosity compared to the other blends for all brines tested.

Example 7

Surfactant Blend 4 in CaCl$_2$ Brine

The following example well servicing fluid compositions were prepared using CaCl$_2$ brine. Examples 7A and 7B employ Surfactant Blend 4, shown in Table 8 above. Examples 7C and 7D were prepared without Surfactant Blend 4 to provide a comparison.

Figure 8:
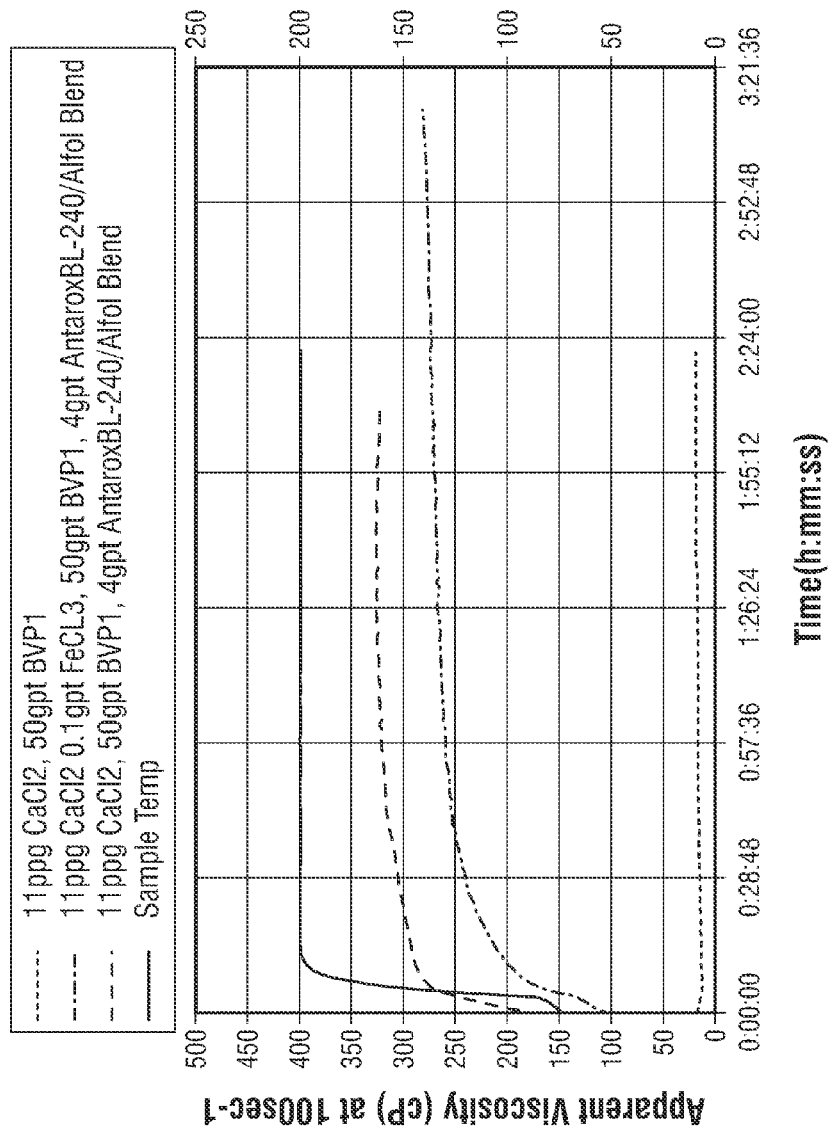

7A. 11 ppg CaCl$_2$,
  50 gpt BVP1,
  4 gpt Surfactant Blend 4
7B. 11 ppg CaCl$_2$,
  50 gpt BVP1,
  4 gpt Surfactant Blend 4
  0.1 gpt FeCl$_3$ 7C. 11 ppg CaCl$_2$,
  50 gpt BVP1,
7D. 11 ppg CaCl$_2$,
  50 gpt BVP1,
  0.1 gpt FeCl$_3$ The compositions of Examples 7A, 7B and 7C were heated to 200° F. Apparent viscosity data was then measured using a Chandler 5550 Viscometer at a shear rate of 100 sec$^{-1}$. Results are shown in FIG. 8.

Figure 9:
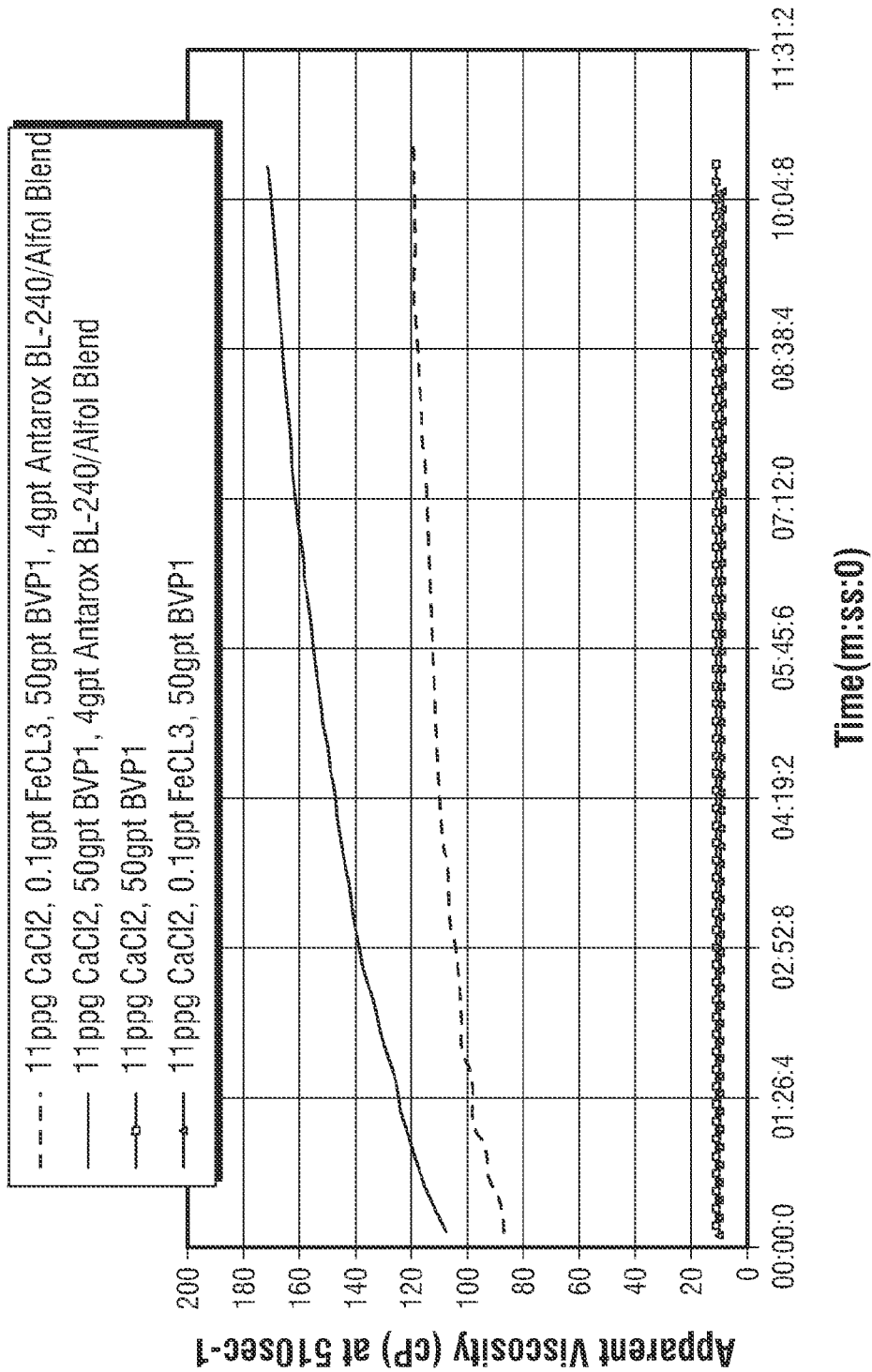

Apparent viscosity testing was performed at room temperature for Examples 7A to 7D using an OFITE M900 Viscometer. The results are shown in FIG. 9.

At both the high temperature and ambient conditions, the Surfactant Blend 4 resulted in a significant increase in apparent viscosity. The addition of FeCl$_3$ resulted in lower apparent viscosity and did not provide any significant benefit in this instance.

Example 8

Surfactant Blend 4 in NaCl/NaBr Brine

The following example well servicing fluid compositions were prepared using NaCl/NaBr brine. Examples 8A and 8B employ Surfactant Blend 4, shown in Table 8 above. Examples 8C and 8D were prepared without Surfactant Blend 4 to provide a comparison.

Figure 10:
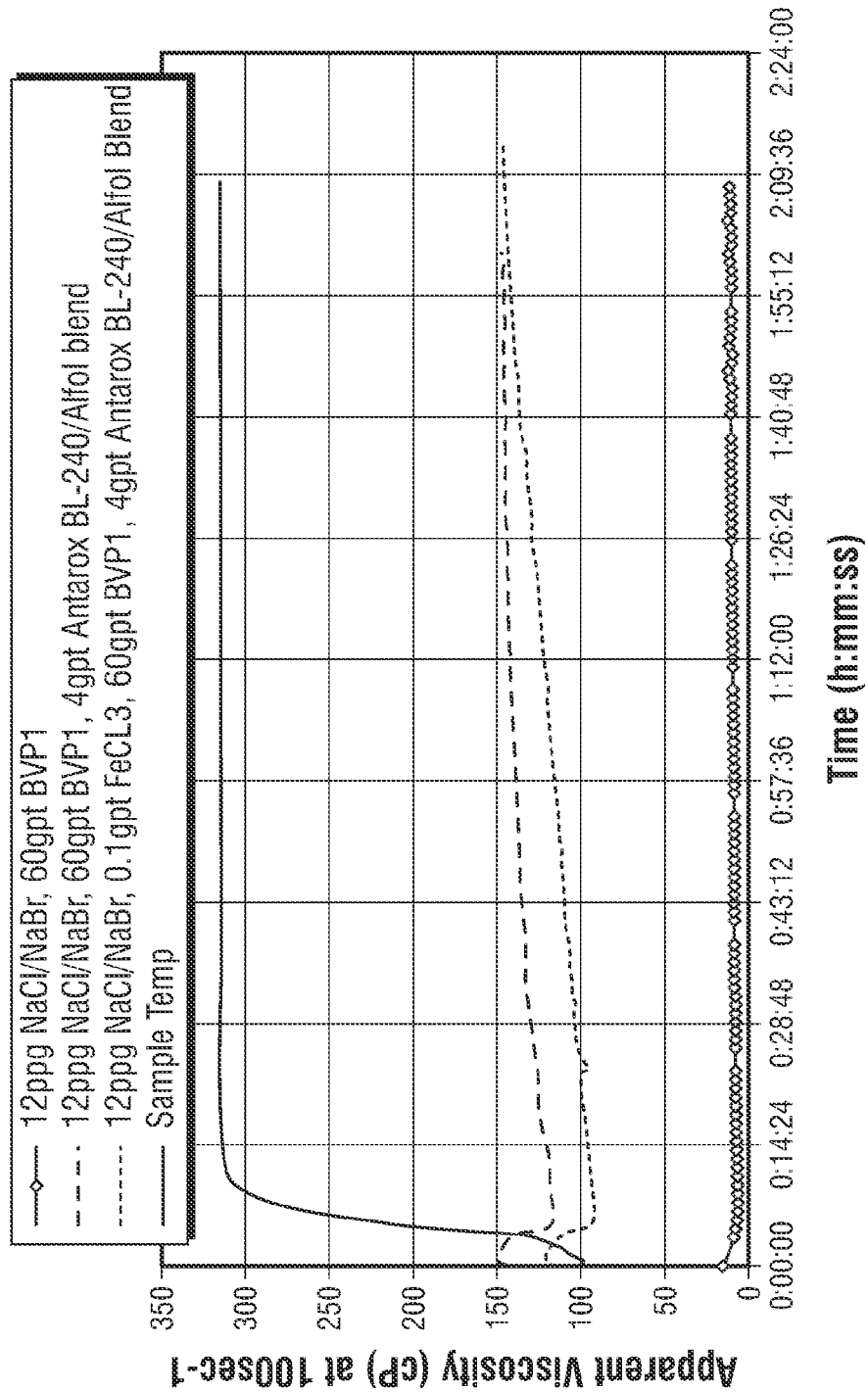

8A. 12 ppg NaCl/NaBr,
  60 gpt BVP1,
  4 gpt Surfactant Blend 4
8B. 12 ppg NaCl/NaBr,
  60 gpt BVP1,
  4 gpt Surfactant Blend 4
  0.1 gpt FeCl$_3$
8C. 12 ppg NaCl/NaBr,
  60 gpt BVP1,
8D. 12 ppg NaCl/NaBr,
  60 gpt BVP1,
  0.1 gpt FeCl$_3$ The compositions of Examples 8A, 8B and 8C were heated to 225° F. Apparent viscosity data was then measured using a Chandler 5550 Viscometer at a shear rate of 100 sec$^{-1}$. Results are shown in FIG. 10.

Figure 11:
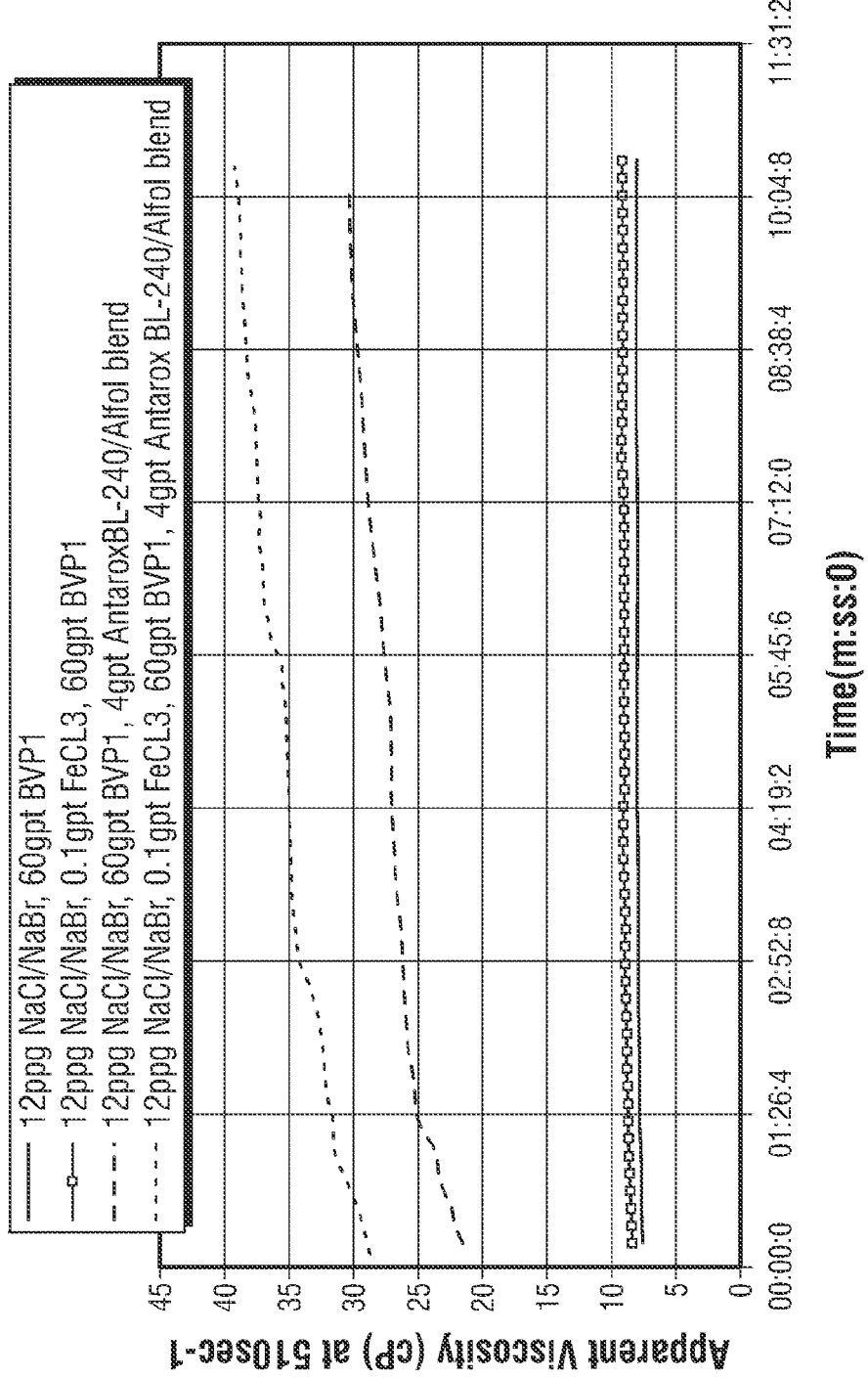

Apparent viscosity testing was performed at room temperature for Examples 8A to 8D using an OFITE M900 Viscometer. The results are shown in FIG. 11. At both the high temperature and ambient conditions, the Surfactant Blend 4 resulted in a significant increase in apparent viscosity. The combination of FeCl$_3$ and the Surfactant Blend 4 resulted in an increase in apparent viscosity over the Surfactant Blend 4 alone at room temperature, as shown in FIG. 11. However, the addition of FeCl$_3$ resulted in lower apparent viscosity for the first two hours when the mixture was heated, as shown by FIG. 10. The iron chloride did not provide any significant benefit in this example.

Example 9

Surfactant Blend 4 in CaC$_{12}$/CaB$_{r2}$ Brine

The following example well servicing fluid compositions were prepared using CaCl$_2$/CaBr$_2$ brine. Examples 9A and 9B employ Surfactant Blend 4, shown in Table 8 above. Examples 9C and 9D were prepared without Surfactant Blend 4 to provide a comparison.

9A. 13 ppg CaCl$_2$/CaBr$_2$,
  40 gpt BVP1,
  4 gpt Surfactant Blend 4

Figure 12A:
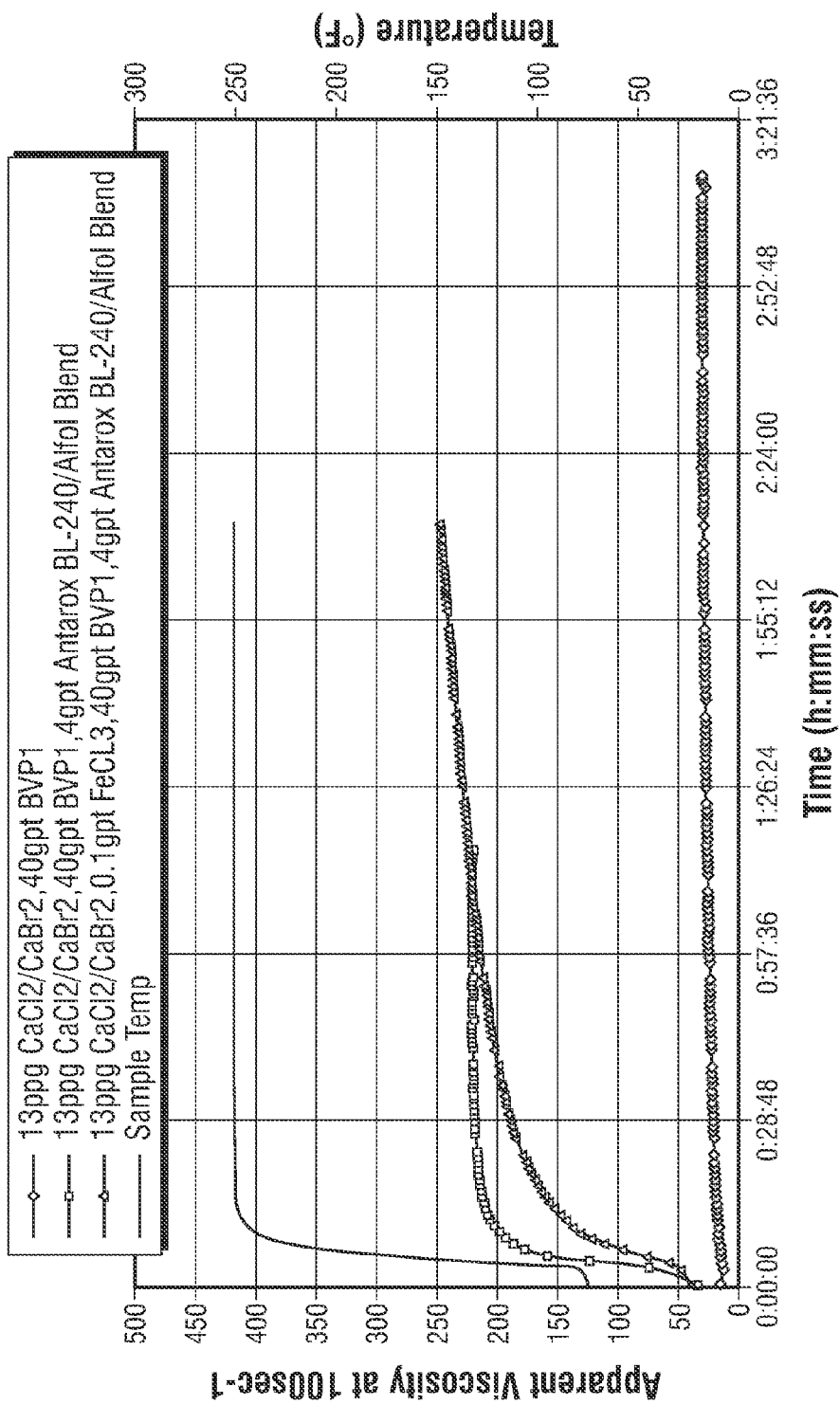
Figure 13:
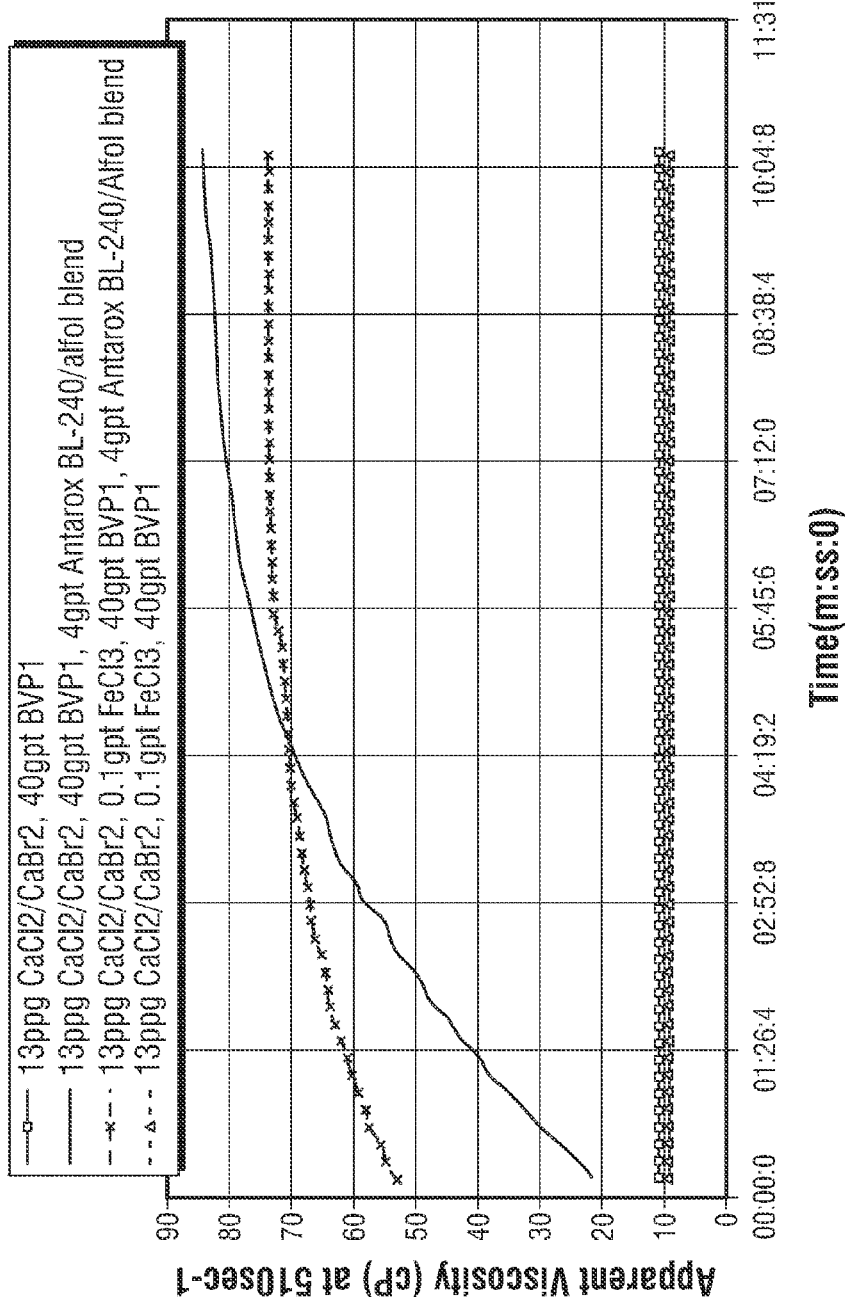

9B. 13 ppg $CaCl_2/CaBr_2$,
  40 gpt BVP1,
  4 gpt Surfactant Blend 4
  0.1 gpt $FeCl_3$
9C. 13 ppg $CaCl_2/CaBr_2$,
  40 gpt BVP1,
9D. 13 ppg $CaCl_2/CaBr_2$,
  40 gpt BVP1,
  0.1 gpt $FeCl_3$ The compositions of Examples 9A, 9B and 9C were heated to 250° F. Apparent viscosity data was then measured using a Chandler 5550 Viscometer at a shear rate of 100 sec$^{-1}$. Results are shown in FIG. 12A Apparent viscosity testing was performed at room temperature for Examples 9A to 9D using an OFITE M900 Viscometer. The results are shown in FIG. 13.

At both the high temperature and ambient conditions, the Surfactant Blend 4 resulted in a significant increase in apparent viscosity. The addition of $FeCl_3$ and the Surfactant Blend 4 resulted in a higher initial apparent viscosity at room temperatures, as shown in FIG. 13. The addition of iron chloride marginally reduces the high temperature viscosity of the system without affecting the stability of the system.

Figure 12B:
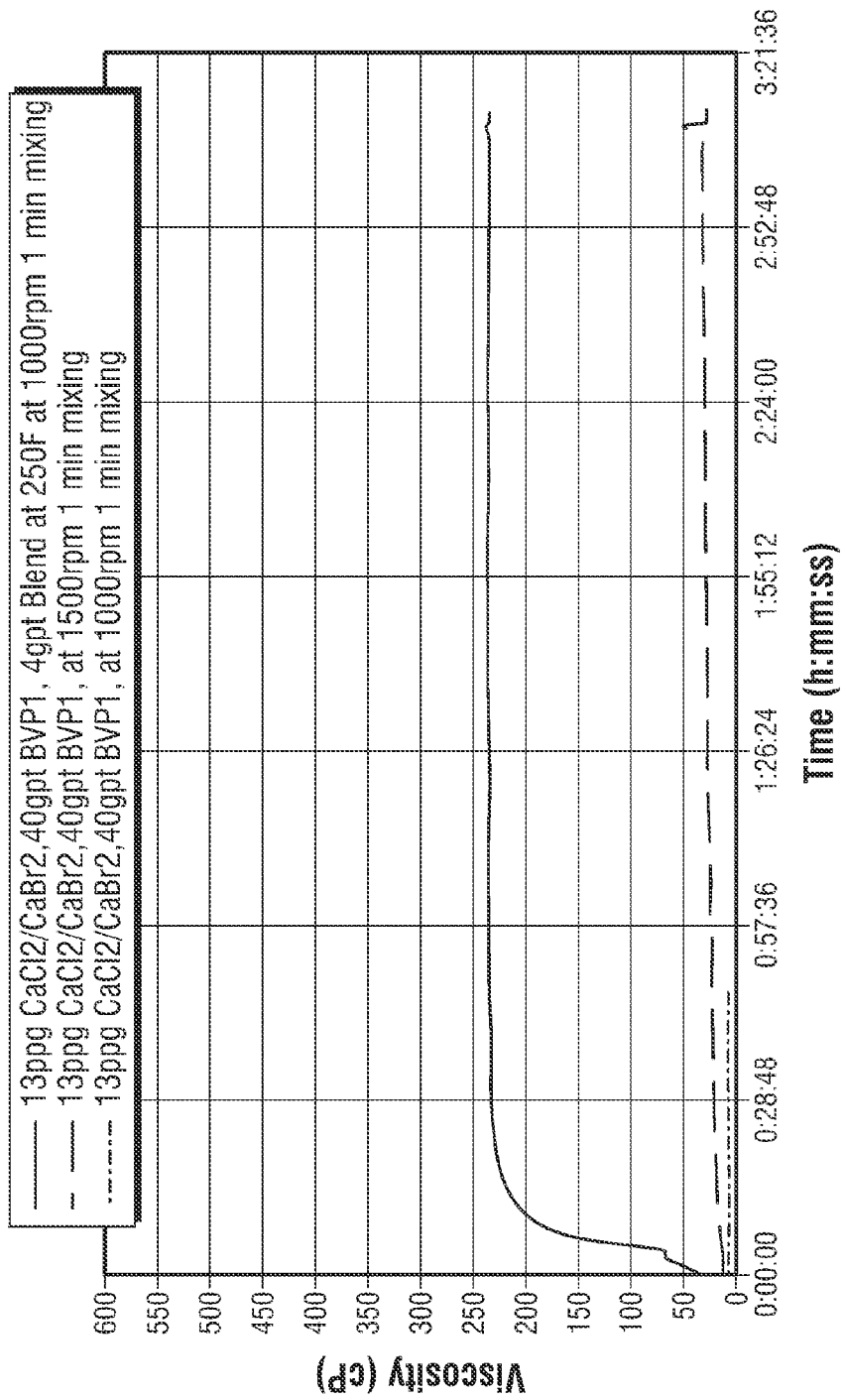

FIG. 12B shows viscosity data for Example 9A, which was formed at 250° F. and 1 minute of mixing. This is compared with a composition of $CaCl_2/CaBr_2$ and BVP1 that was mixed at two different rpms (shear rates) of 1000 and 1500. The results show that without the surfactant, even at higher shear, the viscosity does not increase, where as at 1000 rpm with the addition of the surfactant blend, viscosity increase is achieved.

Example 10

Surfactant Blend 4 in $CaBr_2$ Brine

The following example well servicing fluid compositions were prepared using $CaBr_2$ brine. Examples 10A and 10B employ Surfactant Blend 4, shown in Table 8 above. Examples 10C and 10D were prepared without Surfactant Blend 4 to provide a comparison.

Figure 14:
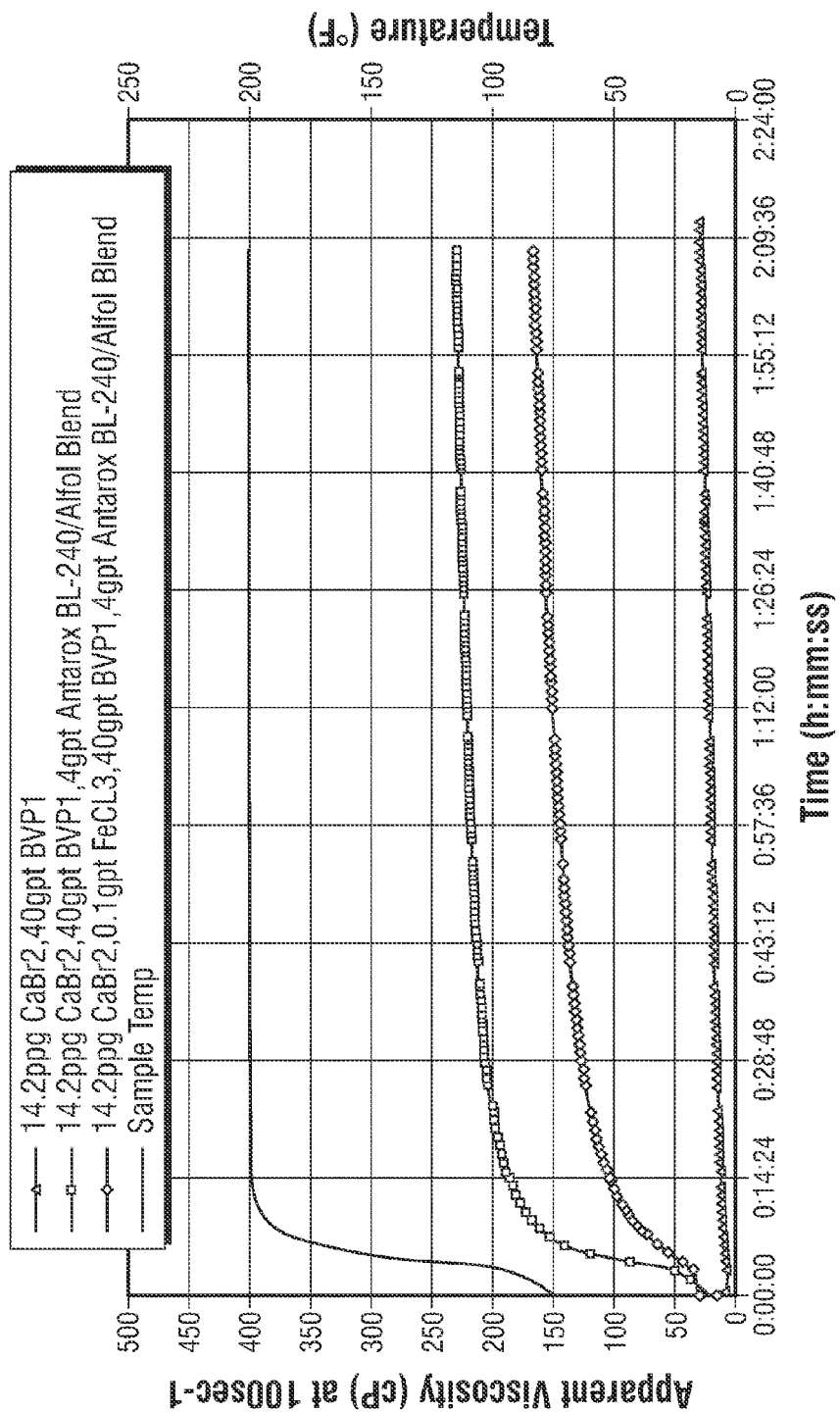

10A. 14.2 ppg $CaBr_2$,
  40 gpt BVP1,
  4 gpt Surfactant Blend 4
10B. 14.2 ppg $CaBr_2$,
  40 gpt BVP1,
  4 gpt Surfactant Blend 4
  0.1 gpt $FeCl_3$
10C. 14.2 ppg $CaBr_2$,
  40 gpt BVP1,
10D. 14.2 ppg $CaBr_2$,
  40 gpt BVP1,
  0.1 gpt $FeCl_3$ The compositions of Examples 10A, 10B and 10C were heated to 200° F. Apparent viscosity data was then measured using a Chandler 5550 Viscometer at a shear rate of 100 sec$^{-1}$. Results are shown in FIG. 14.

Figure 15:
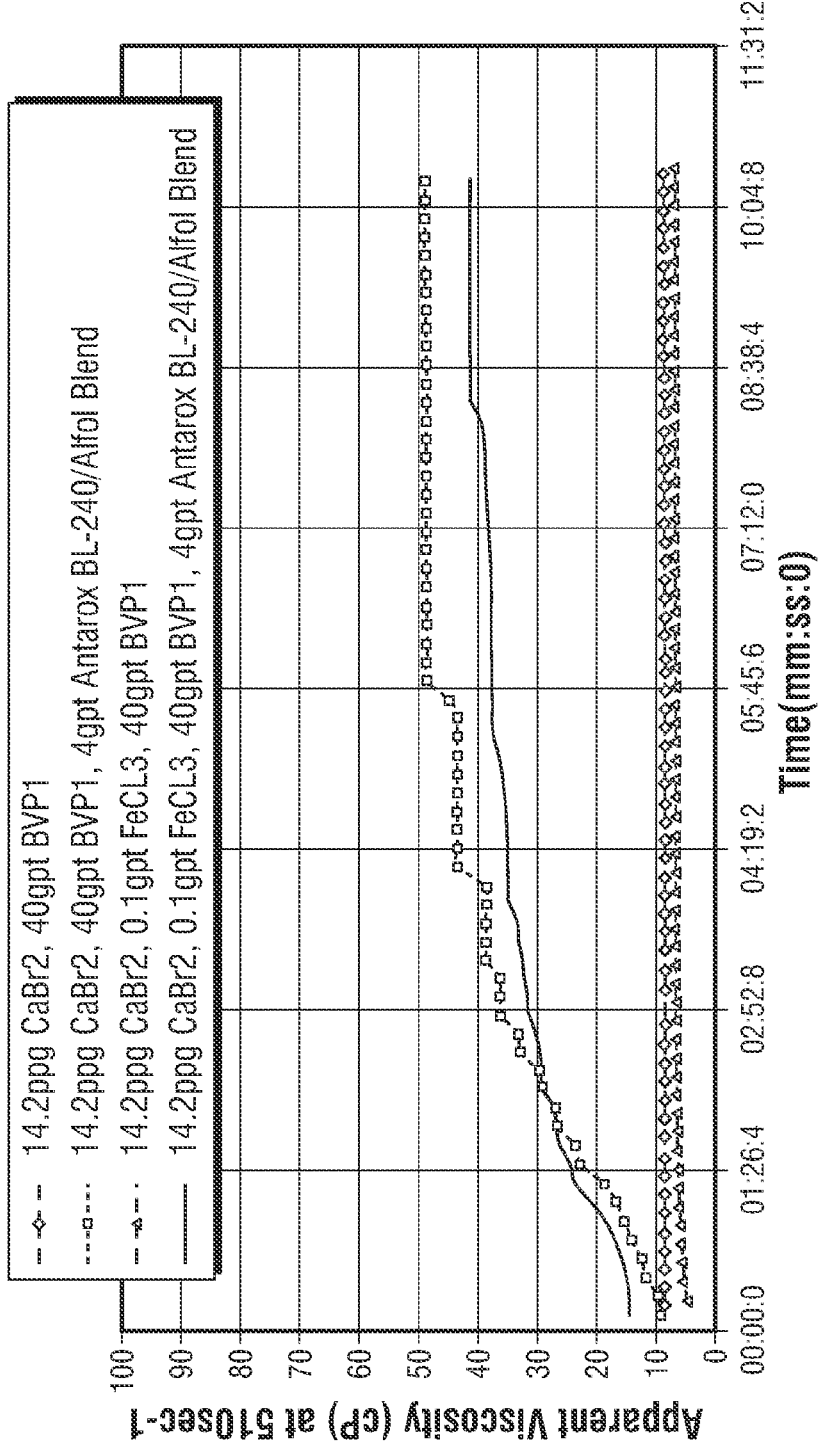

Apparent viscosity testing was performed at room temperature for Examples 10A to 10D using an OFITE M900 Viscometer. The results are shown in FIG. 15.

At both the high temperature and ambient conditions, the Surfactant Blend 4 resulted in a significant increase in apparent viscosity. The addition of $FeCl_3$ resulted in a higher initial apparent viscosity at room temperatures without affecting the stability of the system at the higher temperatures, as shown in FIG. 15.

Example 11

Surfactant Blend 4 in $ZnBr_2$ Brine

The following example well servicing fluid compositions were prepared using $ZnBr_2$ brine. Examples 11A and 11B employ Surfactant Blend 4, shown in Table 8 above. Examples 11C and 11D were prepared without Surfactant Blend 4 to provide a comparison.

Figure 16:
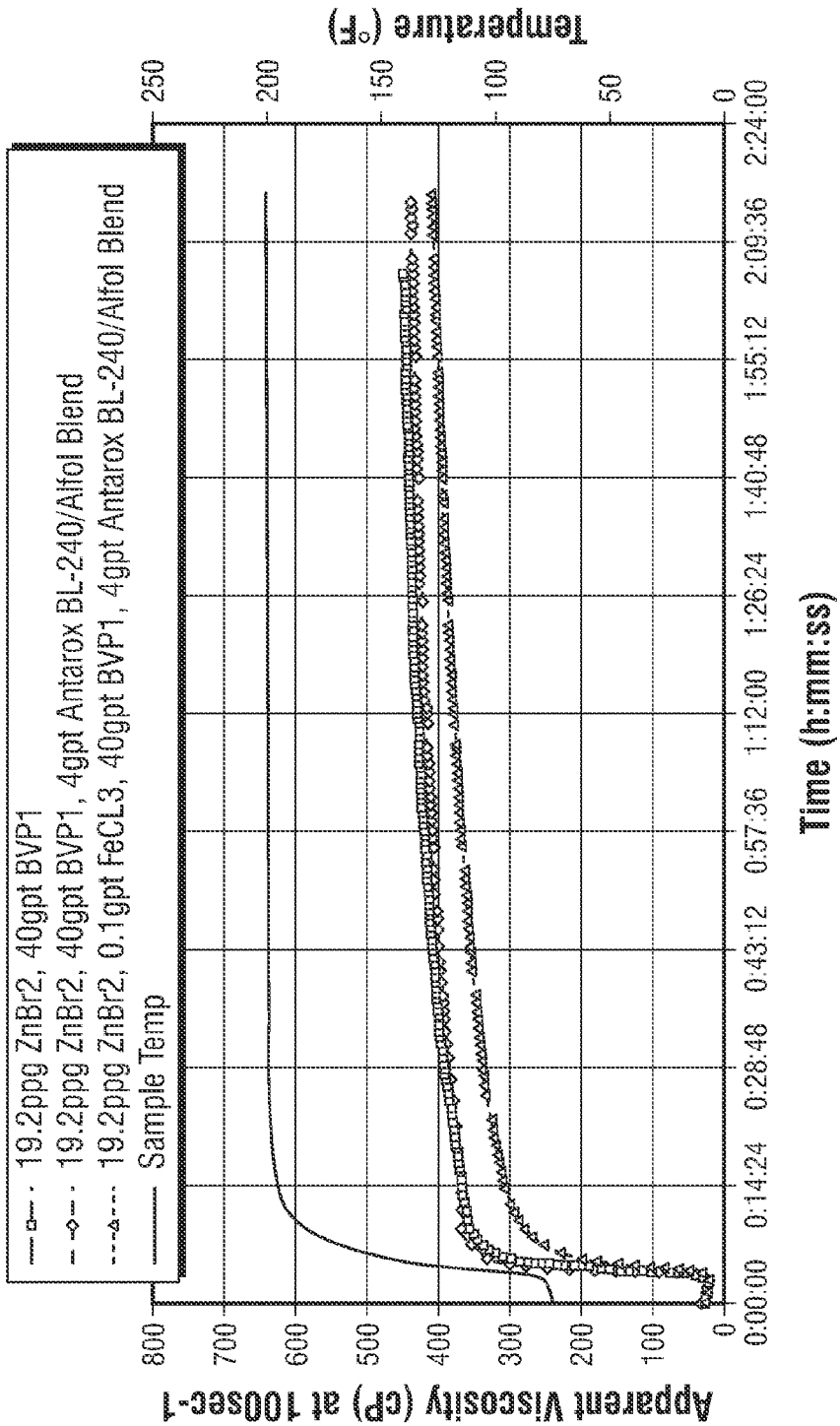

11A. 19.2 ppg $ZnBr_2$,
  40 gpt BVP1,
  4 gpt Surfactant Blend 4
11B. 19.2 ppg $ZnBr_2$,
  40 gpt BVP1,
  4 gpt Surfactant Blend 4
  0.1 gpt $FeCl_3$
11C. 19.2 ppg $ZnBr_2$,
  40 gpt BVP1,
11D. 19.2 ppg $ZnBr_2$,
  40 gpt BVP1,
  0.1 gpt $FeCl_3$ The compositions of Examples 11A, 11B and 11C were heated to 200° F. Apparent viscosity data was then measured using a Chandler 5550 Viscometer at a shear rate of 100 sec$^{-1}$. Results are shown in FIG. 16.

Figure 17:
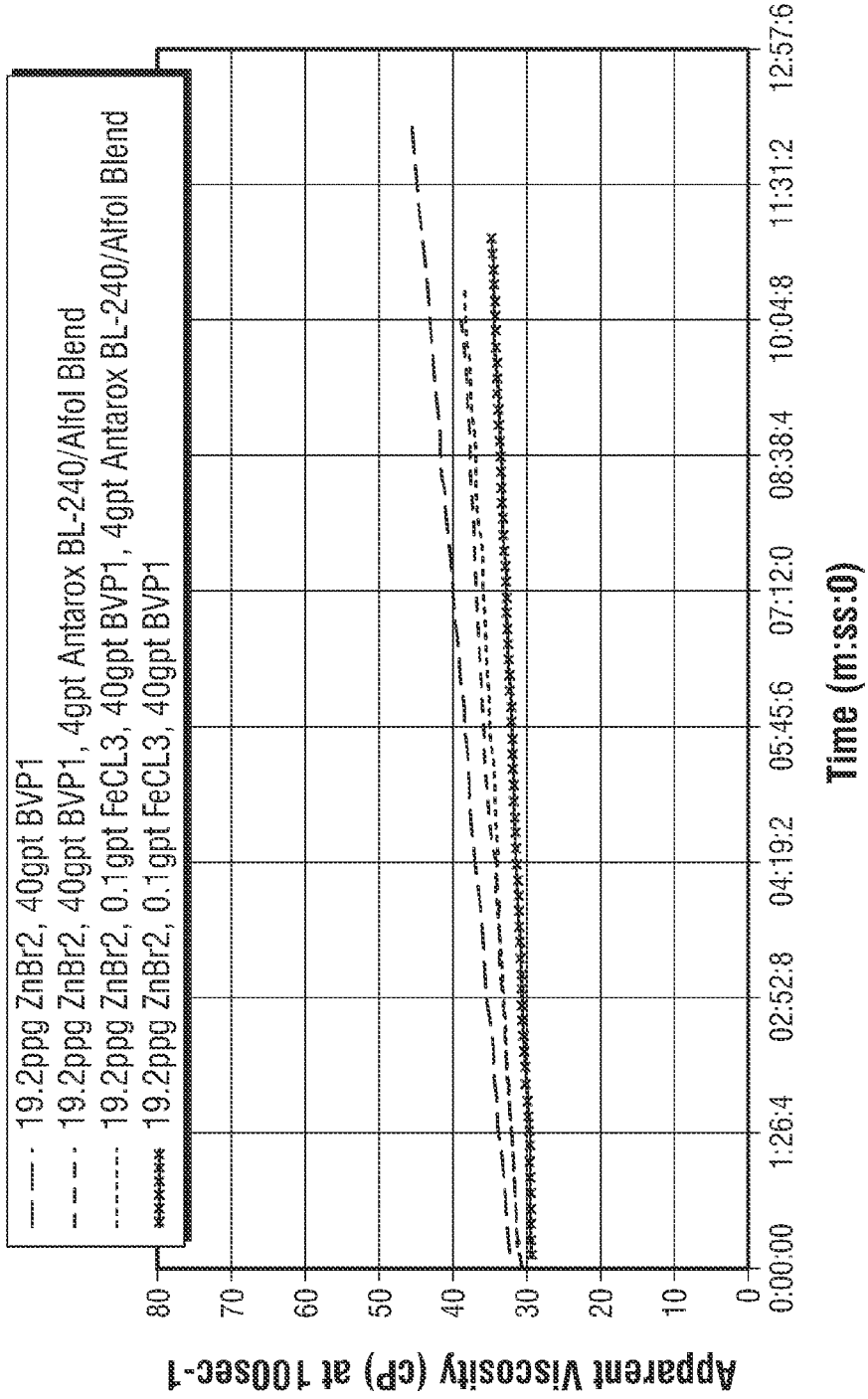

Apparent viscosity testing was performed at room temperature for Examples 7A to 7D using an OFITE M900 Viscometer. The results are shown in FIG. 17. With this high density brine, the addition of the surfactant blend and iron chloride provides marginal improvement to a system that provides adequate viscosity at ambient conditions already.

Figure 18:
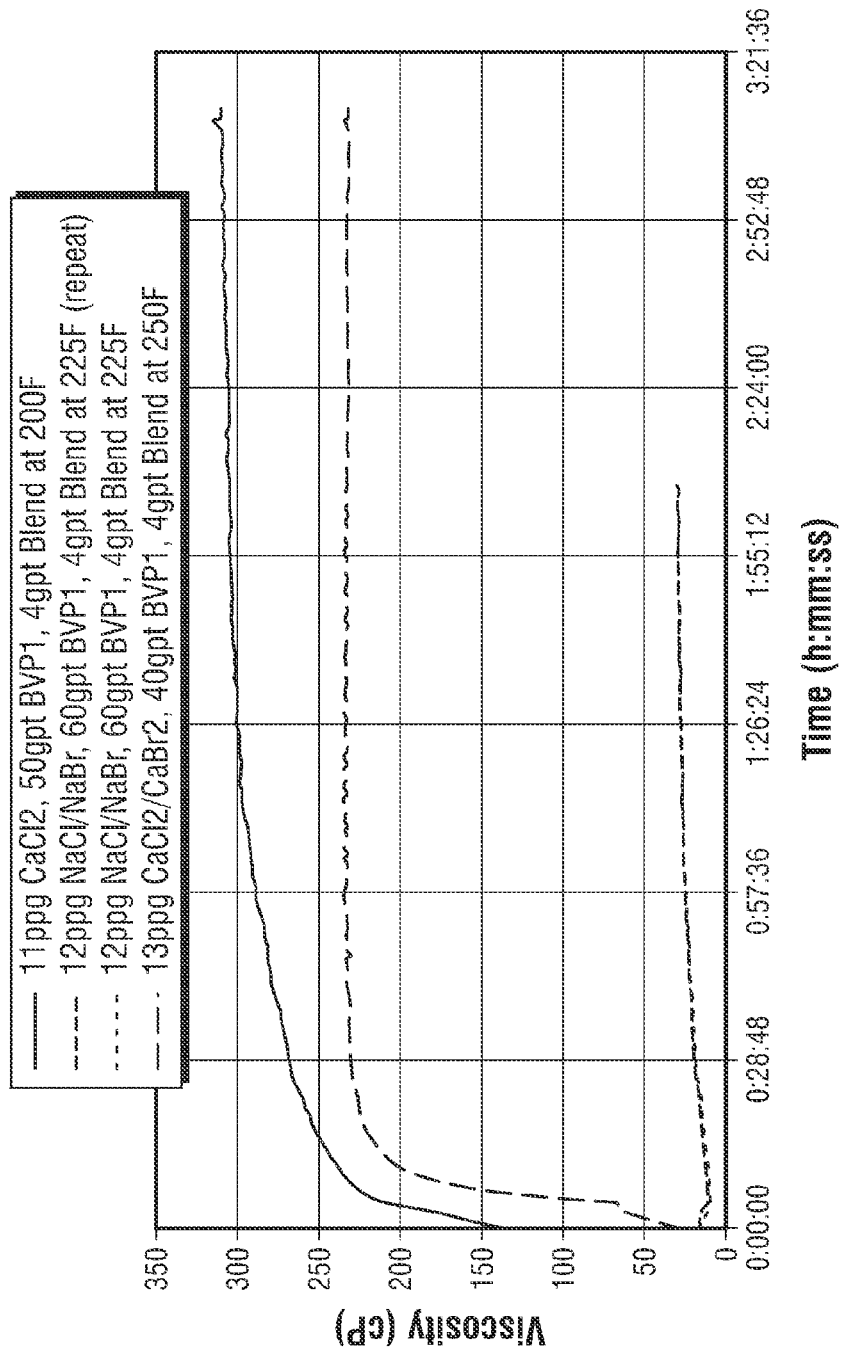
Figure 19:
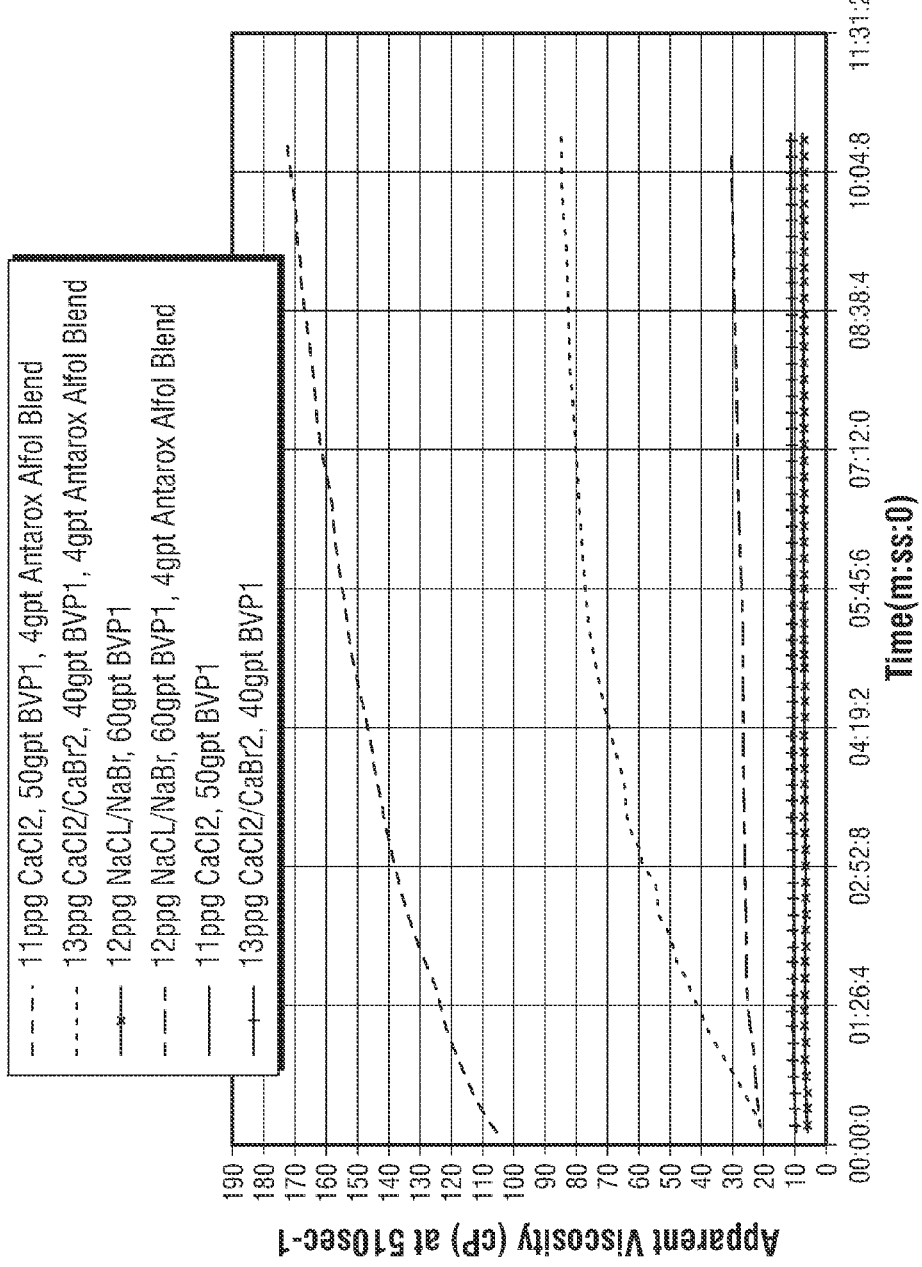

FIGS. 18 and 19 show a comparison of viscosity data for Examples 7A, 8A and 9A above. The comparison shows that the addition of Surfactant Blend 4 provided a significantly greater increase in viscosity for $CaCl_2$ and $CaCl_2/CaBr_2$ based brines than for NaCl/NaBr brine at both room temperature and high temperature testing. As shown in FIG. 19, the Surfactant Blend 4 resulted in a significant increase in viscosity for all three brines when compared to the example compositions without the Surfactant Blend 4.

Although various embodiments have been shown and described, the present disclosure is not so limited and will be understood to include all such modifications and variations as would be apparent to one skilled in the art.

What is claimed is:
1. A method of servicing a well, the method comprising:
blending first, second, and third surfactants to form a surfactant preblend prior to forming a well servicing fluid, the surfactant preblend containing 2-20% by weight of a first surfactant chosen from alcohol ethoxylates, 2-20% by weight of a second surfactant chosen from $C_4$ to $C_{12}$ primary alcohols, and 50-90% by weight of a third surfactant chosen from ethoxylated propoxylated alcohols, the first, second, and third surfactants being different from each other;
mixing ingredients to form a well servicing fluid, the ingredients comprising (i) the surfactant preblend, (ii) 0.033 to 33 weight % of an inverse emulsion with an aqueous phase containing a zwitterionic polymer, the aqueous phase being dispersed in the form of droplets in a hydrophobic external phase, the polymer containing at least one monomer $A_b$ comprising a betaine group and optionally one or more nonionic monomers $B_a$, and (iii) a saline based aqueous solution; and
introducing the well servicing fluid into a hydrocarbon well.

2. The method of claim 1, wherein the alcohol ethoxylates are compounds of the general formula: $R(OC_2H_4)_nOH$, where R is a alkyl group and n ranges from about 1 to about 10.

3. The method of claim 1, wherein the primary alcohols comprise a linear $C_6$ alcohol.

4. The method of claim 1, wherein the ethoxylated propoxylated alcohols are linear ethoxylated propoxylated $C_8$-$C_{10}$ Alcohols.

5. The method of claim 1, wherein the ingredients further comprise ferric chloride.

6. The method of claim 1, wherein the zwitterionic polymers exhibit an intrinsic viscosity of about 320 ml/g or greater in a 20% by weight aqueous NaCl solution.

7. The method of claim 1, wherein the zwitterionic polymers exhibit an intrinsic viscosity of about 600 ml/g or greater in a 20% by weight aqueous NaCl solution.

8. The method of claim 1, wherein the at least one monomer $A_b$ is chosen from sulphobetaines and phosphobetaines.

9. The method of claim 1, wherein the at least one monomer $A_b$ is a substituted or unsubstituted compound chosen from alkylphosphonates of dialkylammonioalkyl acrylates, alkylphosphonates of dialkylammonioalkyl methacrylates, alkylphosphonates of dialkylammonioalkyl acrylamides, alkylphosphonates of dialkylammonioalkyl methacrylamides, alkylsulphonates of dialkylammonioalkyl acrylates, alkylsulphonates of dialkylammonioalkyl methacrylates, alkylsulphonates of dialkylammonioalkyl acrylamides, alkylsulphonates of dialkylammonioalkyl methacrylamides, alkylphosphonates of dialkylammonioalkoxyalkyl acrylates, alkylphosphonates of dialkylammonioalkoxyalkyl methacrylates, alkylphosphonates of dialkylammonioalkoxyalkyl acrylamides, alkylphosphonates of dialkylammonioalkoxyalkyl methacrylamides, alkylsulphonates of dialkylammonioalkoxyalkyl acrylates, alkylsulphonates of dialkylammonioalkoxyalkyl methacrylates, alkylsulphonates of dialkylammonioalkoxyalkyl acrylamides, alkylsulphonates of dialkylammonioalkoxyalkyl methacrylamides, heterocyclic betaine monomers, alkylphosphonates of dialkylammonioalkylallylics, alkylsulphonates of dialkylammonioalkylallylics, alkylphosphonates of dialkylammonioalkylstyrenes, alkylsulphonates of dialkylammonioalkylstyrenes, betaines resulting from ethylenically unsaturated anhydrides and dienes.

10. The method of claim 9, wherein at least one monomer $A_b$ is a heterocyclic betaine chosen from sulphobetaines derived from piperazine, sulphobetaines derived from vinyl substituted pyridines, and sulphobetaines derived from imidazoles.

11. The method of claim 1, wherein the at least one monomer $A_b$ is chosen from compounds of formulae 10, 11, 12, 13, 18, 19, 20, 21, 22 and 23:

(10)

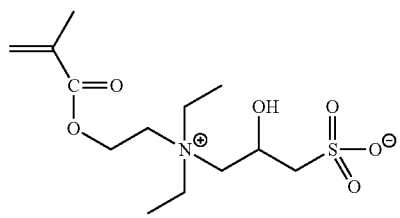

(11)

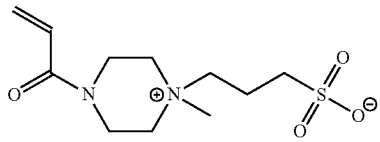

(12)

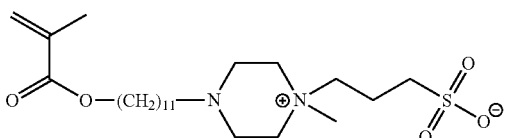

(13)

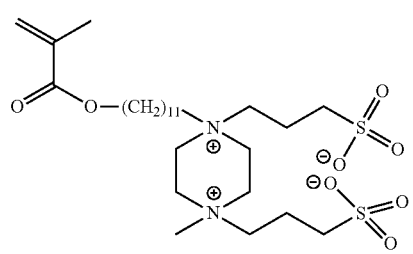

(18)

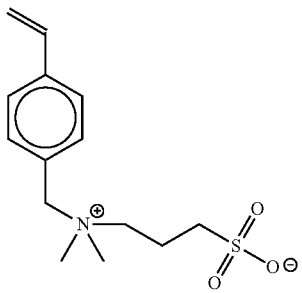

(19)

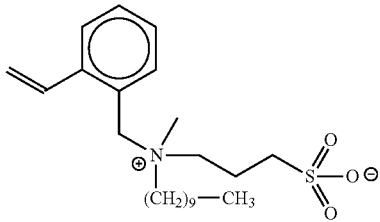

(20)

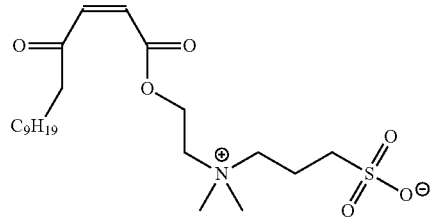

(21)

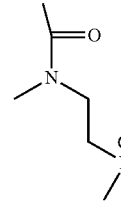

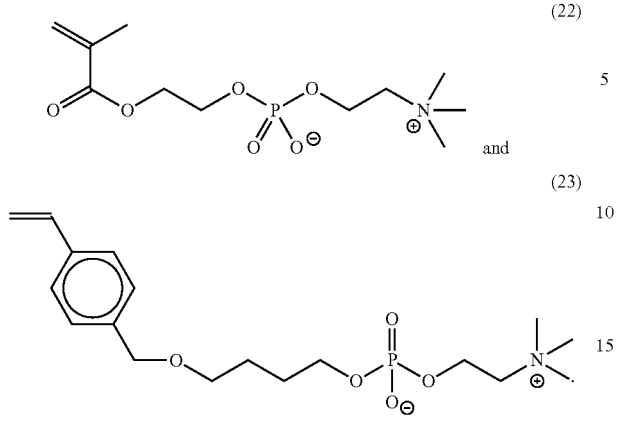

12. The method of claim 1, wherein the at least one monomer $A_b$ is chosen from substituted or unsubstituted compounds of formula 24 and 25:

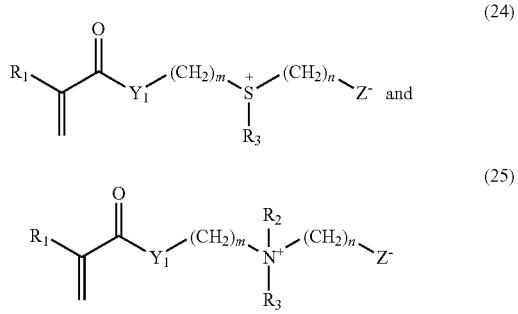

in which:

$R_1$ is hydrogen or methyl, $R_2$ and $R_3$, which are identical or different, are hydrogen or alkyls having from 1 to 6 carbon atoms, $Y_1$ is —O— or $NR_2$, Z— is $SO_3$—, m is 2 or 3, and n is 1-6.

13. The method of claim 1, wherein the at least one monomer $A_b$ is chosen from: sulphopropyldimethylammonioethyl methacrylate, sulphoethyldimethylammonioethyl methacrylate, sulphobutyldimethylammonioethyl methacrylate, sulphohydroxypropyldimethylammonioethyl methacrylate, sulphopropyldimethylammoniopropylacrylamide, sulphopropyldimethylammoniopropylmethacrylamide, sulphohydroxypropyldimethylammoniopropylmethacrylamide, sulphopropyldiethylammonioethoxyethyl methacrylate, 2-vinyl-1-(3-sulphopropyl)pyridinium betaine, 4-vinyl-1-(3-sulphopropyl)pyridinium betaine, sulphopropyldimethylammonioethyl acrylate, 1-vinyl-3-(3-sulphopropyl)imidazolium betaine and sulphopropylmethyldiallylammonium betaine.

14. The method of claim 1, wherein the at least one monomer $A_b$ is chosen from compounds of formula 1, 4, 6, 7 and 8:

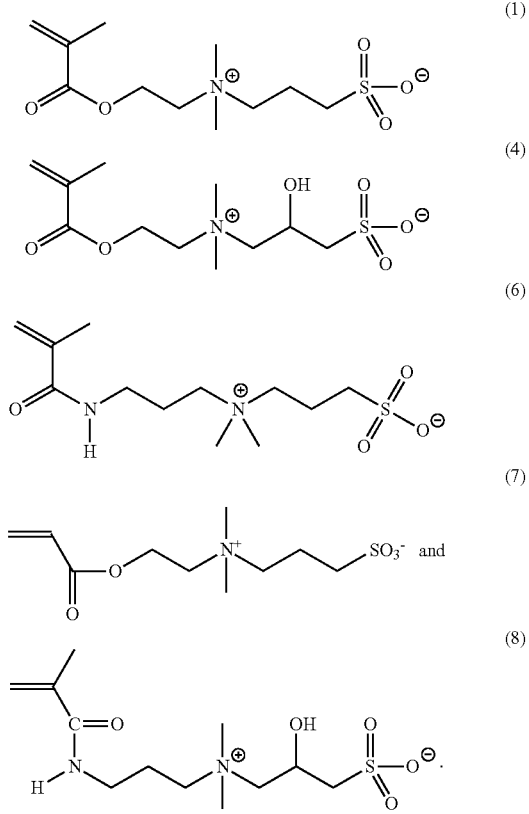

15. The method of claim 1, wherein the zwitterionic polymer comprises the one or more nonionic monomers $B_a$, wherein the one or more nonionic monomers $B_a$ are chosen from hydroxyethyl acrylate, hydroxyethyl methacrylate, hydroxypropyl acrylate, hydroxypropyl methacrylate, glycerol monomethacrylate, acrylamide, methacrylamide, N-methylolacrylamide, dimethylacrylamide, dimethylmethacrylamide, polyethylene oxide, polypropylene oxide, polyethylene/polypropylene oxide copolymers, α-methacrylates, vinyl alcohol and vinylpyrrolidone.

16. The method of claim 15, wherein the at least one monomer $A_b$ is chosen from sulphopropyldimethylammonioethyl methacrylate and sulphopropyldimethylammoniopropylmethacrylamide and the at least one nonionic monomer $B_a$ is acrylamide.

17. The method of claim 1, further comprising preparing the inverse emulsion by:
preparing the inverse emulsion comprising monomer $A_b$ and monomer $B_a$ in an aqueous phase dispersed in the form of droplets in the hydrophobic external phase of the inverse emulsion; and
after preparing the inverse emulsion, forming the zwitterionic polymer by polymerization of the at least one monomer $A_b$ and the one or more nonionic monomers $B_a$.

18. The method of claim 17, wherein during the polymerization, the monomer $B_a$ is a hydrophilic monomer.

19. The method of claim 17, wherein preparing the inverse emulsion comprises mixing at least one emulsifying agent, monomer $A_b$, monomer $B_a$, the aqueous phase and the hydrophobic external phase.

20. The method of claim 1, wherein the aqueous composition is a saline composition having a density of at least 10.5 ppg.

21. The method of claim 1, further comprising fracturing the well bore with the introduced fluid.

22. The method of claim 1, further comprising drilling the well bore simultaneously with introducing the fluid into the well.

23. The method of claim 1, wherein the fluid further comprises gravel, the method further comprising packing the gravel in the well bore.

24. The method of claim 1, wherein the ingredients comprise 0.33 to 17 weight % of the inverse emulsion.

25. The method of claim 24, wherein the zwitterionic polymer ingredient is 3.3 to 17 weight % of an inverse emulsion with an aqueous phase containing the zwitterionic polymer, the aqueous phase being dispersed in the form of droplets in a hydrophobic external phase.

26. A method of servicing a well, the method comprising:
blending first, second, and third surfactants to form a surfactant preblend prior to forming a well servicing fluid, the surfactant preblend containing 2-20% by weight of a first surfactant chosen from alcohol ethoxylates, 2-20% by weight of a second surfactant chosen from $C_4$ to $C_{12}$ primary alcohols, and 50-90% by weight of a third surfactant chosen from linear ethoxylated propoxylated $C_8$-$C_{10}$ alcohols, the first, second, and third surfactants being different from each other:
mixing ingredients to form a well servicing fluid, the ingredients comprising (i) the surfactant preblend, (ii) 0.033 to 33 weight % inverse emulsion with an aqueous phase containing a zwitterionic polymer, the aqueous phase being dispersed in the form of droplets in a hydrophobic external phase, the polymer containing at least one monomer $A_b$ comprising a betaine group and optionally one or more nonionic monomers $B_a$, and (iii) a saline based aqueous solution, the zwitterionic polymer exhibiting an intrinsic viscosity of about 320 ml/g or greater in a 20% by weight aqueous NaCl solution; and
introducing the well servicing fluid into a hydrocarbon well.

27. The method of claim 26, wherein the alcohol ethoxylates are compounds of the general formula: $R(OC_2H_4)_nOH$, where R is a alkyl group and n ranges from 1 to 10 and the primary alcohols comprise a linear $C_6$ alcohol.

28. The method of claim 27, wherein the zwitterionic polymer exhibits an intrinsic viscosity of about 600 ml/g or greater in a 20% by weight aqueous NaCl solution.

\* \* \* \* \*